(12) United States Patent
Kantor et al.

(10) Patent No.: US 11,941,830 B2
(45) Date of Patent: Mar. 26, 2024

(54) DEPTH SENSING USING TEMPORAL CODING

(71) Applicant: META PLATFORMS TECHNOLOGIES, LLC, Menlo Park, CA (US)

(72) Inventors: Niv Kantor, Redwood City, CA (US); Ricardo Garcia, San Bruno, CA (US); Nadav Grossinger, Hillsborough, CA (US); Robert Hasbun, San Jose, CA (US); Nitay Romano, Nitzan (IL)

(73) Assignee: Meta Platforms Technologies, LLC, Menlo Park, CA (US)

( * ) Notice: Subject to any disclaimer, the term of this patent is extended or adjusted under 35 U.S.C. 154(b) by 232 days.

(21) Appl. No.: 17/496,021

(22) Filed: Oct. 7, 2021

(65) Prior Publication Data

US 2022/0028099 A1    Jan. 27, 2022

Related U.S. Application Data

(63) Continuation of application No. 16/150,204, filed on Oct. 2, 2018, now Pat. No. 11,158,074.

(51) Int. Cl.
*G06T 7/521* (2017.01)
*G01S 17/48* (2006.01)

(52) U.S. Cl.
CPC .............. *G06T 7/521* (2017.01); *G01S 17/48* (2013.01); *G06T 2207/10028* (2013.01)

(58) Field of Classification Search
CPC ........... G06T 7/521; G06T 2207/10028; G01S 17/48

(Continued)

(56) References Cited

U.S. PATENT DOCUMENTS

| 2012/0056982 A1 | 3/2012 | Katz et al. |
| 2014/0240492 A1 | 8/2014 | Lee |

(Continued)

FOREIGN PATENT DOCUMENTS

| WO | 2014028251 A1 | 2/2014 |
| WO | 2017035498 A1 | 3/2017 |

OTHER PUBLICATIONS

International Search Report and Written Opinion for International Application No. PCT/US2018/062029, dated Jul. 2, 2019, 11 Pages.

*Primary Examiner* — Matthew David Kim
(74) *Attorney, Agent, or Firm* — Potomac Law Group, PLLC; Dannon G. Allbee

(57) ABSTRACT

In one embodiment, a system includes at least one projector configured to project a plurality of projected patterns, where a projected lighting characteristic of each of the projected patterns varies over a time period in accordance with an associated predetermined temporal lighting-characteristic pattern, a camera configured to capture images of detected patterns during the time period, and one or more processors configured to: determine, for each detected pattern, a detected temporal lighting-characteristic pattern based on variations in a detected lighting characteristic of the detected pattern, identify a detected pattern that corresponds to one of the projected patterns by comparing at least one of the detected temporal lighting-characteristic patterns to at least one of the temporal lighting-characteristic patterns, and compute a depth associated with the detected patterns based on the one or more of the projected patterns, the detected pattern, and a relative position between the camera and the projector.

20 Claims, 23 Drawing Sheets

(58) Field of Classification Search
USPC .......................................................... 348/135
See application file for complete search history.

(56) References Cited

U.S. PATENT DOCUMENTS

| | | | |
|---|---|---|---|
| 2015/0172622 A1* | 6/2015 | Yoon | H04N 13/122 |
| | | | 345/694 |
| 2016/0057340 A1 | 2/2016 | You et al. | |
| 2016/0116336 A1* | 4/2016 | Zhao | G01J 3/26 |
| | | | 250/205 |
| 2016/0119523 A1* | 4/2016 | Egger | H04N 23/56 |
| | | | 348/370 |
| 2017/0156192 A1* | 6/2017 | Chern | G02B 27/30 |
| 2017/0285169 A1 | 10/2017 | Holz | |
| 2017/0303847 A1* | 10/2017 | Drucker | A61B 5/0077 |
| 2018/0048880 A1* | 2/2018 | Trail | H04N 13/344 |
| 2018/0073873 A1* | 3/2018 | Takao | G01S 17/48 |
| 2018/0112862 A1* | 4/2018 | Gammons | H05B 47/19 |
| 2018/0131911 A1* | 5/2018 | Mizuno | H04N 9/3164 |
| 2018/0134217 A1* | 5/2018 | Peterson | G06V 20/58 |
| 2018/0297511 A1* | 10/2018 | Park | B60Q 1/143 |
| 2019/0045173 A1* | 2/2019 | Hicks | G01B 11/2545 |
| 2019/0082112 A1* | 3/2019 | Qian | G01S 1/7038 |
| 2021/0029290 A1* | 1/2021 | Okuike | G06T 7/20 |

\* cited by examiner

DEPTH SENSING USING TEMPORAL CODING

PRIORITY

This application is a continuation under 35 U.S.C. § 120 of U.S. patent application Ser. No. 16/150,204 filed 2 Oct. 2018, incorporated herein by reference.

TECHNICAL FIELD

This disclosure generally relates to structured light, and in particular to systems and methods for determining depth using structured light patterns.

BACKGROUND

Augmented Reality (AR) systems may augment a real-world environment with sensory effects to provide an enhanced experience to users. AR systems may use devices such as cameras and head-mounted displays to integrate virtual objects with the real-world environment. Components of an AR system (e.g., a head-mounted display) may be connected and/or networked with a host computer system, a mobile device or computing system, or any other hardware platform capable of providing AR content to one or more users.

One challenge in AR systems is accurately determining the positions of physical objects in the real-world environment so that virtual objects can be displayed and tactile feedback can be provided to users based on the locations of the physical and virtual objects. Depth sensing may be implemented in AR systems to determine the positions of physical objects and thereby provide a mapping of the real-world environment. Distances from a sensor, such as a camera, to objects in a scene may be determined using structured light scanning, which involves projecting light patterns onto the scene. The sensor may be used to capture reflections of the patterns, and the distances to the objects may be determined by analyzing the reflections. The reflections may be distorted by the shapes of the objects in the scene, and the distances to points on the surfaces of the objects in the scene may be calculated based on the distortions of the patterns detected by the sensor. The calculated distances may be used to construct a depth map that may associate a distance with each pixel in an image of the scene to represent the three-dimensional surfaces of objects in the scene. Depth maps may be used in AR applications and may be generated by devices having light projectors and cameras, such as mobile phones, AR glasses, AR headsets, and the like.

SUMMARY OF PARTICULAR EMBODIMENTS

Particular embodiments described herein relate to depth sensing using structured light. In various embodiments, a depth sensing system may include one more projectors and a detector. The projectors emit may structured light of known patterns into an environment and the detector may detect reflections of the emitted light from objects in the environment. The reflections may be used to compute depth information for objects within the environment. For example, a depth map that represents the three-dimensional features of objects in the environment may be generated by triangulating the emitted light and detected reflected light.

In particular embodiments, depth sensing may be performed by projecting a pattern, such as a line, and varying a projected lighting characteristic of the pattern, such as lighting intensity, over a time period according to a temporal lighting-characteristic pattern, which may be associated with the projected pattern. The temporal lighting-characteristic pattern may be a pattern of lighting intensities, for example. A camera may capture the projected pattern, e.g., the line, in a plurality of images over the time period to form a detected pattern, and determine a detected temporal lighting characteristic pattern, e.g., a pattern of lighting intensities, based on the detected pattern. The depth sensing system may identify the particular projected pattern that corresponds to a given detected pattern by comparing the detected temporal lighting characteristic pattern to the projected temporal lighting characteristic patterns that were used for projected patterns. The projected pattern that has the same temporal lighting characteristic pattern may be the particular projected pattern that corresponds to the given detected pattern.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
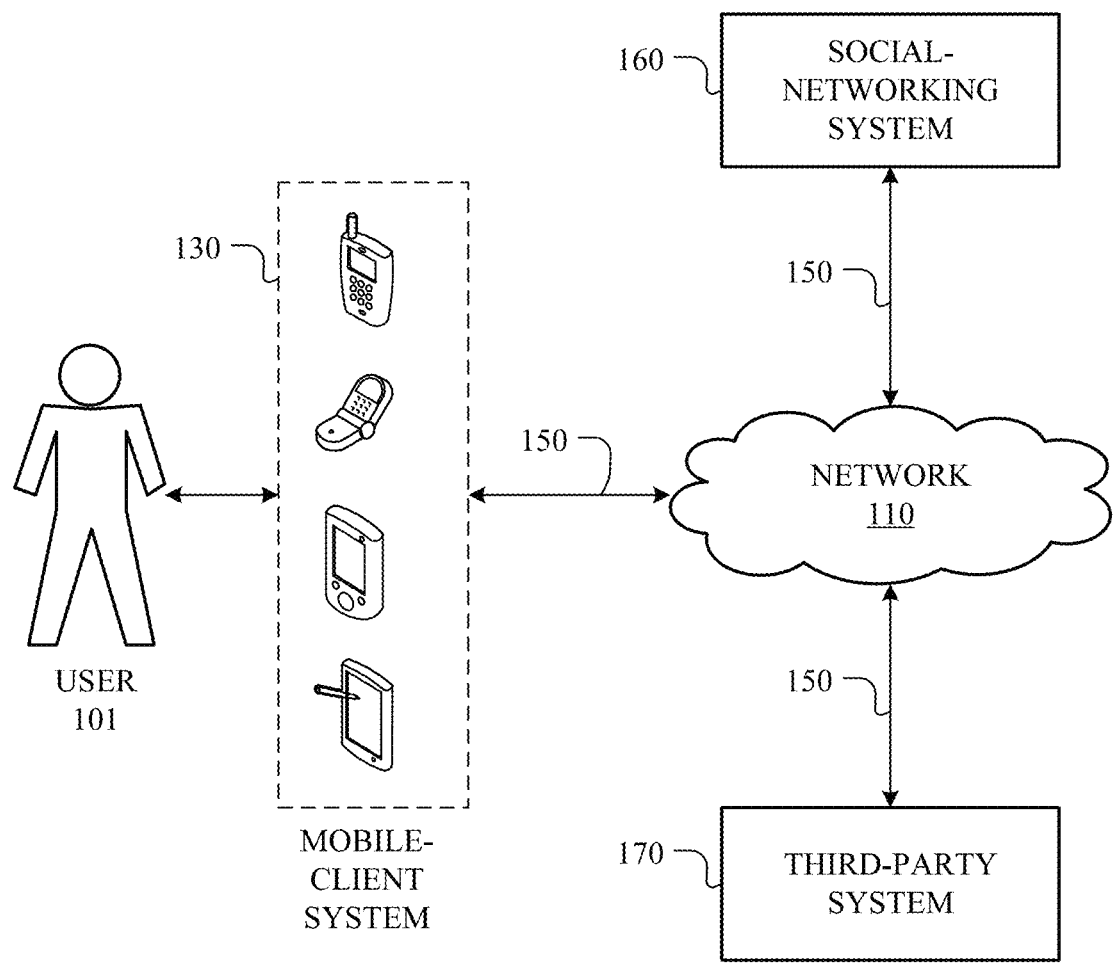
FIG. 1 illustrates an example network environment associated with a computing system.

FIG. 1 illustrates an example network environment 100 associated with a computing system 160. Network environment 100 includes a user 101, a client system 130 (e.g., a head-mounted display), a computing system 160, and a third-party system 170 connected to each other by a network 110. Although FIG. 1 illustrates a particular arrangement of user 101, client system 130, computing system 160, third-party system 170, and network 110, this disclosure contemplates any suitable arrangement of user 101, client system 130, computing system 160, third-party system 170, and network 110. As an example and not by way of limitation, two or more of client system 130, computing system 160, and third-party system 170 may be connected to each other directly, bypassing network 110. As another example, two or more of client system 130, computing system 160, and third-party system 170 may be physically or logically co-located with each other in whole or in part. Moreover, although FIG. 1 illustrates a particular number of users 101, client systems 130, computing systems 160, third-party systems 170, and networks 110, this disclosure contemplates any suitable number of users 101, client systems 130, computing systems 160, third-party systems 170, and networks 110. As an example and not by way of limitation, network environment 100 may include multiple users 101, client system 130, computing systems 160, third-party systems 170, and networks 110.

In particular embodiments, user 101 may be an individual (e.g., a human user) that interacts or communicates with or over computing system 160. In particular embodiments, computing system 160 may generate, store, receive, and send data related to generating an artificial reality environment, including, for example, and without limitation, visual data, audio data, tactile data, and so forth. Computing system 160 may be accessed by the other components of network environment 100 either directly or via network 110. In particular embodiments, third-party system 170 may be structured-light projectors and/or detectors, wall-mounted speaker system, a mobile sensor system, a haptic actuator, and so forth. Third-party system 170 may be accessed by the other components of network environment 100 either directly or via network 110. In particular embodiments, one or more client systems 130, such as a head-mounted display, may access, send data to, and receive data from computing system 160 and/or third-party system 170. Client system 130 may access computing system 160 or third-party system 170 directly, via network 110, or via a third-party system. As an example and not by way of limitation, client system 130 may access third-party system 170 via computing system 160. Client system 130 may be any suitable computing device, such as, for example, a head-mounted display, augmented/virtual reality device, and so forth.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, computing system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi, Bluetooth, or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2A:
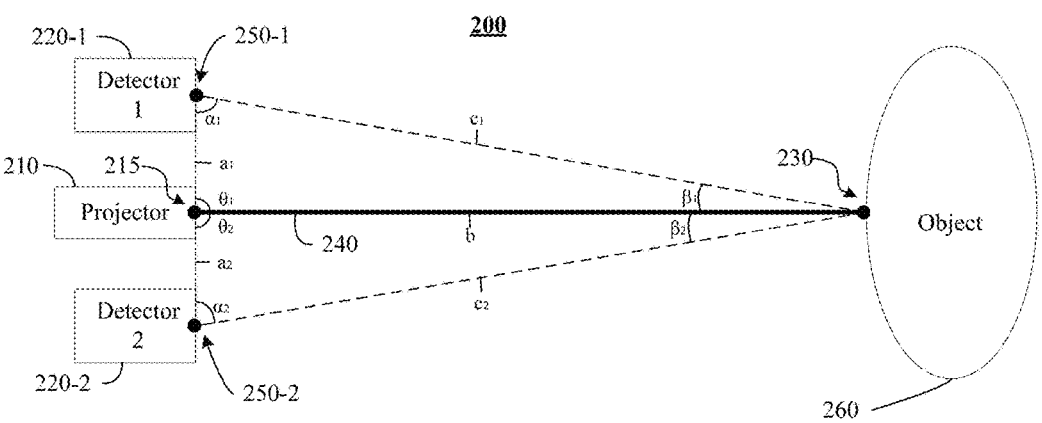
FIG. 2A illustrates an example of a triangulation computation.

FIG. 2A illustrates an example of a triangulation computation. For simplicity, the figure shows the triangulation as a two-dimensional setup, but one of ordinary skill in the art would recognize that the same concept can be applied in three dimensions. System environment 200 includes a projector 210, which, for triangulation purposes, may be represented by a projector location 215 (e.g., a point representation of the projector's lens). Conceptually, light emission 240 is projected from the projector location 215 (shown as a single beam for simplicity, but the emission could be multiple beams or planes) and intersects an object 260 at reflection point 230. The system environment 200, in particular embodiments, further includes two detectors 220-1 and 220-2 (collectively referred to as detectors 220) configured to have substantially overlapping fields of view. For purposes of the triangulation computation, detectors 220-1 and 220-2 may be represented by detector location 250-1 and detector location 250-2, respectively (collectively referred to as detector locations 250). In particular embodiments, the detector locations 250 may be pin-hole lenses that are conceptually defined for the detectors 220.

Projector 210 may include any type of device that is capable of emitting light. For example, projector 210 may include a laser emitter, such as a vertical-cavity surface-emitting laser (VCSEL). Functionally, projector 210 emits light emission 240 into system environment 200. Light emission 240 may have various characteristics, such as a beam size, a beam shape, a beam intensity, a beam wavelength, and so forth. In particular embodiments, light emission 240 may be a coherent, collimated emission of light (e.g., a laser). Light emission 240 may travel through system environment 200 in the form of a line, a grid, a torus, and so forth. In addition, light emission 240 may include multiple instances of one or more forms (e.g., two or more lines, two or more torus shapes, two or more grids, etc.). In various embodiments, light emission 240 interacts with objects that lie in the path of light emission 240 (e.g., object 260). The object could be, for example and not by way of limitation, a wall, a chair, a human, an animal, a tree, a plant, a curved surface, a mesh, and so forth. For example, object 260 may reflect and/or absorb some or all of light emission 240. In particular, line $c_1$ may represent a portion of light emission 240 reflected by object 260 that is incident on detector 220-1. Similarly, line $c_2$ may represent a portion of light emission 240 reflected by object 260 that is incident on detector 220-2.

Detector 220-1 and detector 220-2 may be any type of device that is capable of detecting light. For example, either or both of detector 220-1 and detector 220-2 may be an inside-outside light detector or camera mounted on a mobile platform, an array sensor (e.g., a linear array sensor, a planar array sensor, a circular array sensor, etc.), and so forth. In various embodiments, detector 220-1 and detector 220-2 may be unfiltered. Accordingly, detector 220-1 and detector 220-2 may exhibit a similar detection sensitivity to various wavelengths of light, without exhibit of preferential detection sensitivity to select wavelength bands of light, such as the wavelength of the light emission 240. Operationally, detector 220-1 detects light traveling into a detector aperture (not shown). In some embodiments, detector 220-1 and detector 220-2 may each include one or more lenses that focus light. For example, and not by way of limitation, a lens may focus light traveling along line $c_1$ to an image sensor of detector 220-1. In various embodiments, detector 220-1 transmits the position of the detected light to a client system 130 (e.g., a head-mounted display) for determining the position of objects in system environment 200.

In various embodiments, a processor in the head-mounted display executes an AR application (stored in any or all of the client system 130, the computing system 160, or the third-party system 170) to process data received from the detectors 220. For example, the AR application may analyze inputs received from the detector 220-1 to identify signals corresponding to the reflection point 230 of the light emission 240. For example, the AR application could filter out signals corresponding to light below a preset threshold intensity. Once the AR application identifies a candidate detector signal that may correspond to the reflection point 230, the AR application may verify that it, in fact, corresponds to the reflection point 230 and calculate the depth of the reflection point 230 on the object 260 using triangulation techniques.

The geometric relationship between the projector 210, each of the detectors 220, and the reflection point 230 on the object 260 may be used to form the basis for triangulation computation. The line $a_1$ represents a known baseline distance between the projector location 215 and the detector location 250-1 of detector 220-1. Similarly, line $a_2$ represents a known baseline distance between the projector location 215 and the detector location 250-2 of detector 220-2. Further, line b represents the path of light emission 240 emitted from the projector location 215. Light emission 240 may reflect off of an object 260 at reflection point 230. Line $c_1$ may represent the path of reflected light traveling towards detector location 250-1 from the reflection point 230, and line $c_2$ may represent the path of reflected light traveling towards detector location 250-2 from the reflection point 230.

Accordingly, a first triangle (herein referred to as "triangle 1") may be described by the line $a_1$, line $c_1$, and line b, forming angle $\alpha_1$ between line $a_1$ and line $c_1$, angle $\beta_1$ between line $c_1$ and line b, and an angle $\theta_1$ between line b and line $a_1$. As described above, the length of line $a_1$ is known since it may be pre-computed based on the fixed detector location 250-1 and the fixed projector location 215. In particular embodiments, the angle $\theta_1$ may also be known since the trajectory of the light emission 240 relative to the fixed relative positions between detector location 250-1 and projector location 215 (represented by baseline $a_1$) is known. Although the angle $\theta_1$ illustrated in FIG. 2A appears to be a right angle (i.e., a 90-degree angle), one of ordinary skill in the art would appreciate that $\theta_1$ is not limited to such and could be any other angle. Lastly, the angle $\alpha_1$ may be computed based on the location of the reflection point 230 in the field of view of detector 250-1. The point at which the reflection point 230 is captured by the sensor of detector 220-1 corresponds to a point in the image plane defined by the field of view of detector 220-1. Conceptually, where that point appears in the image plane is where the line $c_1$ intersects the image plane. That point of intersection in the image plane and the known center of the image plane, together with the known relationships between the center of the image plane and the detector location 250-1 (e.g., the distance between the center of the image plane and the detector location 250-1 and the angle between the image plane and the line connecting the detector location 250-1 and the center), may be used to compute the angle $\alpha_1$ (e.g., via triangulation). Once angle $\alpha_1$, side $a_1$, and angle $\theta_1$ are ascertained, the rest of the dimensions of triangle 1 could be computed based on known geometric properties of triangles.

For example, the length of line b could be computed to represent a first depth of reflection point 230 from the projector location 215.

As previously described, one challenge with performing depth computations using emitted light is that the corresponding reflected light as captured by the detector needs to be accurately identified. If a point in the captured image is mistakenly identified as the reflection of the emitted light, the triangulation computation would be erroneous since various triangulation assumptions would not hold (e.g., if the mistakenly-identified point in the image does not correspond to the reflection point 230, it cannot be used to represent the point of intersection of line $c_1$ and the image plane and therefore the computation of the angle $\alpha_1$ would be erroneous). One way to assist with the detection of emitted light is to emit light in a particular wavelength (e.g., infrared) and use detectors with filters that are tailored for that wavelength. However, as previously described, doing so may not be practical in various applications. For example, if the depth sensing system is to be integrated with a head-mounted display with limited resources (e.g., power, real estate, and weight), adding a specialized filtered detector for detecting structured light may be infeasible or undesirable, especially since the head-mounted display may already have unfiltered cameras that are used for object detection and other sensory purposes.

To assist with accurate identification of emitted light, particular embodiments verify a that a candidate reflection point is, in fact, a reflection of the emitted light by performing a second depth computation for that point using information captured by a second unfiltered camera. Referring again to FIG. 2A, a second triangle (herein referred to as "triangle 2") may be described by the line $a_2$, line $c_2$, and line b, forming angle $\alpha_2$ between line $a_2$ and line $c_2$, angle $\beta_2$ between line $c_2$ and line b, and angle $\theta_2$ between line b and line $a_2$. Similar to line $a_1$ and angle $\theta_1$, line $a_2$ and angle $\theta_2$ may be known due to the known relative fixed positions of the projector location 215 and detector location 250-2 and the trajectory of the emitted light 240. The computation of angle $\alpha_2$ may be similar to how $\alpha_1$ is computed, described in further detail above. In particular embodiments, a point in the image captured by detector 220-2 may be identified as corresponding to the reflection point 230 captured in the image of detector 220-1. In particular embodiments, the correspondence between the points in the two captured images may be determined using any suitable stereo correspondence or matching algorithms. Based on the location of such a point in the image plane defined by the field of view of detector 220-2, along with the known center of that image plane and the known relationships between the center of the image plane and the detector location 250-2 (e.g., the distance between the center of the image plane and the detector location 250-2 and the angle between the image plane and the line connecting the detector location 250-2 and the center), may be used to compute the angle $\alpha_2$ (e.g., via triangulation). Once angle $\alpha_2$, side $a_2$, and angle $\theta_2$ are ascertained, the rest of the dimensions of triangle 2 could be computed based on known geometric properties of triangles. For example, the length of line b could be computed to represent a second depth of reflection point 230 from the projector location. If the second depth of reflection point 230 computed using detector 220-2 differs (e.g., beyond a predetermined threshold) from the first depth computed using detector 220-1, then the reflection point 230 may be deemed to not correspond to the emitted light 240 and rejected.

Figure 2B:
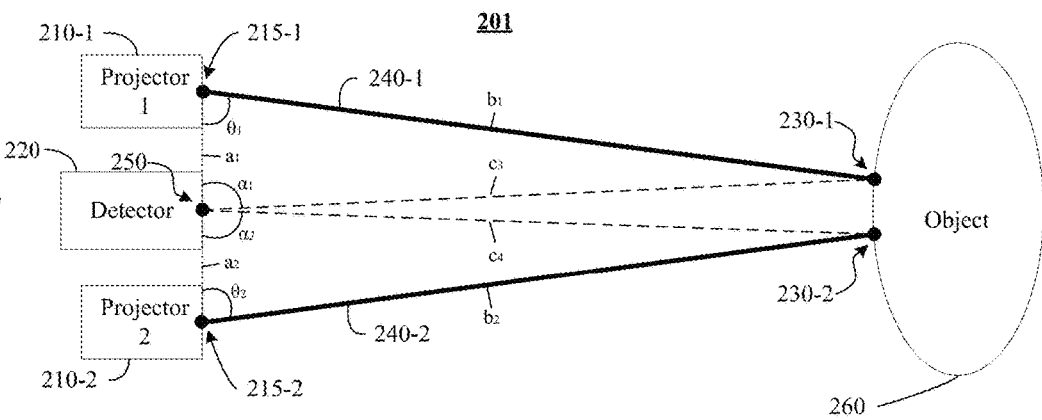
FIG. 2B illustrates an example of a triangulation computation using two projectors.

FIG. 2B illustrates an example of a triangulation computation using two projectors 210-1 and 210-2. For simplicity, the figure shows the triangulation as a two-dimensional setup, but one of ordinary skill in the art would recognize that the same concept can be applied in three dimensions. System environment 201 includes two projectors 210-1 and 210-2, which, for triangulation purposes, may be represented by projector locations 215-1 and 215-2 (e.g., point representations of the projector lenses). Conceptually, light emissions 240-1 and 240-2 are projected from the respective projector locations 215-1 and 215-2 (shown as single beams for simplicity, but the emissions could be multiple beams or planes) and intersect an object 260 at respective reflection points 230-1 and 230-2. The system environment 201, in particular embodiments, further includes a detector 220 having a field of view. For purposes of the triangulation computation, the detector 220 may be represented by a detector location 250. In particular embodiments, the detector location 250 may be a pin-hole lens that is conceptually defined for the detector 220. Projectors 210-1 and 210-2 may be devices that are capable of emitting light, as described above with reference to FIG. 2A. Detector 220 may be any type of device that is capable of detecting light, as described above with reference to FIG. 2A.

The geometric relationship between the projectors 210, the detector 220, and the reflection points 230 on the object 260 may be used to form the basis for triangulation computation. The line $a_1$ represents a known baseline distance between the projector location 215-1 and the detector location 250. Similarly, line $a_2$ represents a known baseline distance between the projector location 215-2 and the detector location 250. Further, line $b_1$ represents the path of light emission 240-1 emitted from the projector location 215-1, and line $b_2$ represents the path of light emission 240-2 emitted from the projector location 215-2. Light emissions 240-1 and 240-2 may reflect off of an object 260 at reflection points 230-1 and 230-2, respectively. Line $c_3$ may represent the path of reflected light traveling towards detector location 250 from the reflection point 230-1, and line $c_4$ may represent the path of reflected light traveling towards detector location 250 from the reflection point 230-2.

Accordingly, a first triangle (herein referred to as "triangle 1") may be described by the line $a_1$, line $c_3$, and line $b_1$, forming angle $\alpha_1$ between line $a_1$ and line $c_3$, angle $\beta_1$ between line $c_1$ and line b, and an angle $\theta_1$ between line b and line $a_1$. As described above, the length of line $a_1$ is known since it may be pre-computed based on the fixed detector location 250 and the fixed projector location 215-1. In particular embodiments, the angle $\theta_1$ may also be known since the trajectory of the light emission 240-1 relative to the fixed relative positions between detector location 250 and projector location 215-1 (represented by baseline $a_1$) is known. Lastly, the angle $\alpha_1$ may be computed based on the location of the reflection point 230-1 in the field of view of detector 250. The point at which the reflection point 230-1 is captured by the sensor of detector 220 corresponds to a point in the image plane defined by the field of view of detector 220. Conceptually, where that point appears in the image plane is where the line $c_3$ intersects the image plane. That point of intersection in the image plane and the known center of the image plane, together with the known relationships between the center of the image plane and the detector location 250-1 (e.g., the distance between the center of the image plane and the detector location 250-1 and the angle between the image plane and the line connecting the detector location 250-1 and the center), may be used to compute the angle $\alpha_1$ (e.g., via triangulation). Once angle $\alpha_1$, side $a_1$, and angle $\theta_1$ are ascertained, the rest of the dimensions of triangle 1 could be computed based on known geometric properties of triangles. For example, the length of line $b_1$ could be computed to represent a first depth of reflection point 230-1 from the projector location 215-1.

Figure 3:
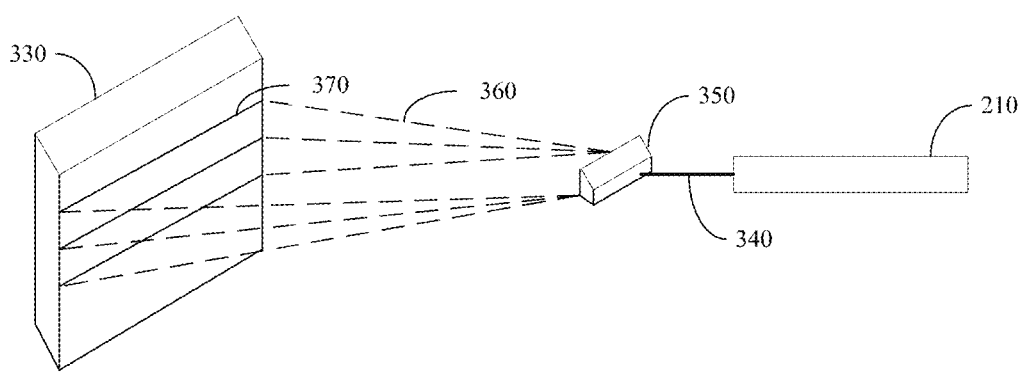
FIG. 3 illustrates an example of a projector.

FIG. 3 illustrates an example of a projector 210. System environment 300 includes projector 210, a laser emission 340, optical element 350, emission pattern 360, and light projection 370 on object 330. Projector 210 may include any type of device that is capable of emitting light. For example, projector 210 may include a laser emitter, such as a vertical-cavity surface-emitting laser (VCSEL). Light emission 340 may have various characteristics, such as a beam size, a beam shape, a beam intensity, a beam wavelength, and so forth. In particular embodiments, light emission 340 may be a coherent, collimated emission of light (e.g., a laser). Light emission 340 may travel through system environment 300 in the form of a line, a grid, a torus, and so forth. In addition, light emission 340 may include multiple instances of one or more forms (e.g., two or more lines, two or more torus shapes, two or more grids, etc.).

In various embodiments, the light emission 340 may pass through one or more optical elements 350 to generated structured light used for depth sensing. The optical element 350 may include diffractive elements, refractive elements, and/or reflective elements. The optical element 350 may collimate the light emission 340, may focus the light emission 340, may split the light emission 340 into multiple beams, may diffuse the light emission preferentially along one or more axes to generate a line and/or a grid pattern, may focus and/or diffuse the light emission 340. In particular, the optical element 350 may include a collimator for collimating light, a beam splitter for splitting light emission 340 into two or more beams. In addition, the optical element 350 may include a line generator, such as a homogenizer with a non-periodic cross-section along one axis, a diffractive optical element with grating angular separation less than a spot angular width, a reflective or refractive surface curved along one dimension, and so forth.

In some embodiments, the optical element 350 may modify the light emission 340 to produce structured light with an emission pattern 360 (e.g., one or more lines) that propagate through the environment 300. In various embodiments, the emission pattern 360 interacts with physical objects (e.g., 330) in its path. The object could be, for example and not by way of limitation, a wall, a chair, a human, an animal, a tree, a plant, a curved surface, a mesh, and so forth. For example, object 330 may reflect and/or absorb some or all of the light emission. When the emission pattern 360 encounters an object in the environment (e.g., object 330), the line superimposes on the object 330, producing light projections 370. Light projections 370 may outline the contours of object 330, wrapping around curves, cusps, discontinuities, and so forth, thereby providing visual cues for textured or otherwise uneven surfaces and/or edges of object 330. Accordingly, the AR application may identify a distortion or discontinuity in the light projections 370, as compared to the expected emission pattern 360, to determine characteristics of the object 330.

Figure 4A:
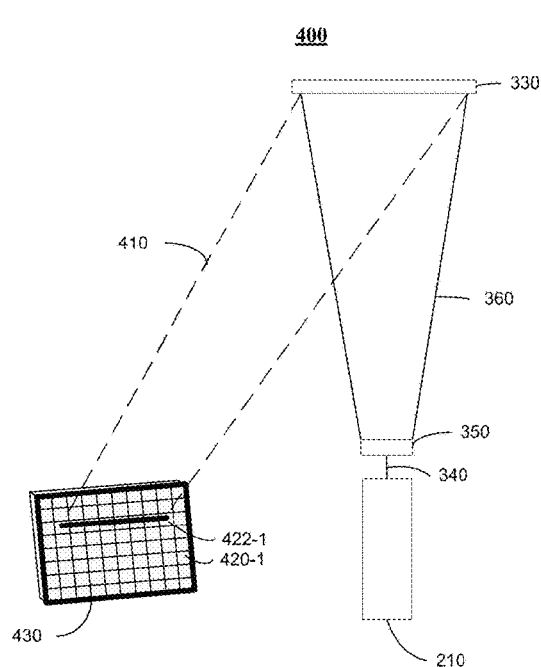
FIG. 4A illustrates an example detection event.

FIG. 4A illustrates an example detection event. System environment 400 includes projector 210, light emission 340, optical element 350, emission pattern 360, object 330, reflected light 410, and image sensor 430 (e.g., of detector 220-1 or detector 220-2, shown in FIG. 2A). Image sensor 430 may include a grid of pixels (which may also be referred to as photosites), one of which is identified as pixel 420-1. Certain pixels may detect the reflected light 410. For ease of reference, such pixels are referred herein as light-reflection pixels (e.g., one of which is identified as light-reflection pixel 422-1).

In various embodiments, the emission pattern 360 forms a light projection on object 330, which can be detected by the image sensor 430. In particular, the object 330 reflects a portion of the light emission pattern 360 towards the image sensor 430. In various embodiments, the object 330 may include specular surfaces and/or diffuse surfaces. Specular surfaces may preferentially deflect light at a particular angle (e.g., at an angle to the object surface normal that mirrors the incident angle to the normal of the light pattern 360). Diffuse surfaces reflect light in multiple directions, without preferential reflection at certain angles.

In various embodiments, the image sensor 430 may include an array of light-sensitive pixels, also referred to as photosites, such as pixels 420-1. When light from the environment 400 encounters a pixel, the pixel may generate a signal. For example, a voltage drop across the pixel 420-1 may increase or decrease proportionally to the intensity of light received by the pixel 420-1. Similarly, when reflected light 410 from the object 330 encounters a pixel 422-1, the pixel may generate a signal. As shown in FIG. 4A, reflected light 410 is detected by pixels 422-1. In some embodiments, the intensity of reflected light 410 may exceed an average intensity of ambient light in system environment 400. Accordingly, the AR application may apply an intensity discriminator to disambiguate between reflected light 410 corresponding to the emission pattern 360 and other light sources (referred herein as spurious light or spurious signals). This process, for example, may help select candidate pixels that are more likely to correspond to reflected light 410. In various embodiments, each candidate pixel may undergo the process described above with reference to FIG. 2A to verify that the pixel, in fact, corresponds to the reflected light 410 and its depth may be computed based on triangulation. Accordingly, the AR application may obtain a three-dimensional measurement of objects in system environment 400. In addition, as the position of the light projection generated by light pattern 360 moves along the surface of object 330 and/or moves around system environment 400, the AR application may continually generate depth and/or coordinate data from reflected light 410. The AR application may further compile the generated depth and/or coordinate data to form a three-dimensional depth map of object 330 and/or system environment 400. In further embodiments, the AR application may resolve the detection coordinates corresponding to reflected light 410 to sub-pixel accuracy, thereby increasing the detection resolution.

Figure 4B:
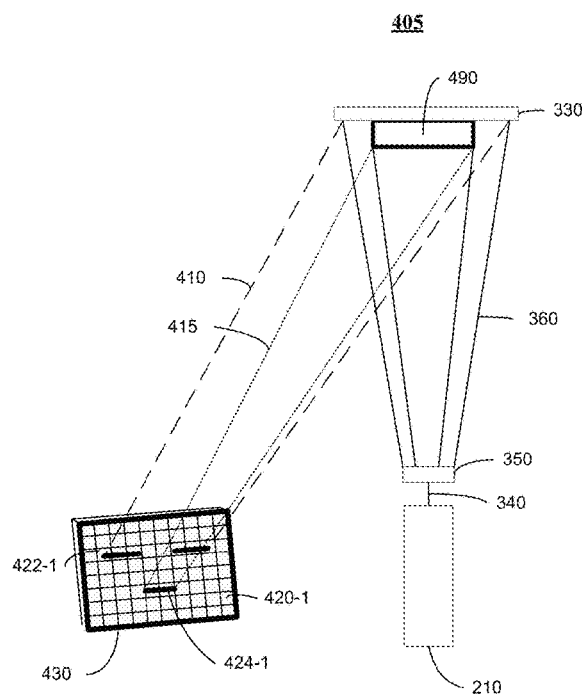
FIG. 4B illustrates an example detection event of a surface abnormality.

FIG. 4B illustrates an example detection event of a surface abnormality. System environment 405 includes projector 210, light emission 340, optical element 350, emission pattern 360, object 330, reflected light 410, and image sensor 430 (e.g., of detector 220-1 or detector 220-2, shown in FIG. 2A). Image sensor 430 may include a grid of pixels (which may also be referred to as photosites), one of which is identified as pixel 420-1.

In addition, system environment 405 includes object 490 that partially occludes object 330 and introduces surface discontinuities between the edges of object 490 and the surface 330. Reflected light from object 490 (herein referred to as reflected light 415) strikes certain pixels of the image sensor 430, such as pixel 424-1, at locations that differ from the position at which reflected light 410 from the object 330 strikes the pixels (e.g., such as pixel 422-1), forming a discontinuous pattern. In various embodiments, the characteristics of the reflected light 415 indicate surface properties of object 490. In particular, the AR application may utilize the location, orientation, number, intensity, and/or distribution of pixels (e.g., pixel 424-1) that receive reflected light 415 to determine the surface properties of object 490 and/or the relationship between object 490 and object 330. For example, as shown, there is a discontinuity between pixels associated with reflected light 410 (e.g., pixel 422-1) and pixels associated with reflected light 415 (e.g., pixel 424-1). The AR application may analyze some or all of the displacement, orientation, number, intensity, and/or distribution of pixels associated with reflected light 410 relative to those of pixels associated with reflected light 415, in addition to the triangulation technique of FIG. 2A, to characterize and image object 330, object 490, and the surface discontinuity between objects 330 and object 490. For example, in some embodiments, pixels (e.g., 424-1) associated with reflected light 415 may be located below, above, to the left, to the right, rotate to the left, rotated to the right, etc. relative to pixels (e.g., 422-1) associated with reflected light 410. Additionally, or alternatively, the pixels associated with reflected light 410 may have a different intensity, a different spatial distribution, and/or a different number of pixels relative to the pixels associated with reflected light 415.

Furthermore, in some embodiments, projector 210 may emit multiple instances of a light pattern 360 towards an object 330 and object 490 (e.g., two or more lines of laser light) to improve the efficiency of depth mapping (e.g., the depth of multiple regions of the environment may be simultaneously determined). Accordingly, image sensor 430 may receive reflected light from each instance of light pattern 360 that reflects off of objects in the environment 405. An application may analyze signals from the image sensor 430 to associate each signal with a particular instance of light pattern 360 emitted. The application may match or associate each light-reflection pixel (e.g., pixel 422-1 or 424-1 shown in FIG. 4B) detected by a detector (e.g., detector 220-1 and/or detector 220-2) with a particular instance of the emission pattern 360 reflected off of object 330 and/or object 490. In certain embodiments, to facilitate the matching process, each instance of the emission pattern 360 may have a unique signature (e.g., each line may have a different intensity, wavelength, temporal or spatial encoding, etc.).

In other embodiments, the instances of the emission pattern 360 may have identical lighting characteristics (e.g., same intensity, color, pitch, etc.), except for their relative ordering. The ordering may be used in particular embodiments to match each instance of emission pattern with detected lighting patterns. For example, the emission pattern 360 may include 5 lines that are vertically (and/or horizontally) spaced, oriented, and/or rotated from each other with a constant or variable separation distance and/or rotational angle. An application may analyze the detector signals generated by detector 220-1 and/or detector 220-2 to identify and determine the relative ordering of reflected lighting patterns. As an example, the projector may project 5 ordered lines that are parallel to one another and spaced to cover an expected field of view of the detectors. The reflected light from the 5 ordered lines, when detected by the detector, would maintain their relative ordering. In various embodiments, the reflected lighting patterns detected by the detector may be logically grouped so that the reflected lighting patterns belonging to the same group are deemed to correspond to the same projected line. In various embodiments, segments or pixels of reflected lighting patterns may be grouped based on their relative positions or other characteristics (a spatial separation distance, a spatial separation direction, a spatial orientation, and so forth) to other segments or pixels of reflected lighting patterns. For example, if a segment of reflected lighting pattern is closer to one group of reflected lighting patterns than any other group, then it may be classified as belonging to that group. By identifying groups of reflected lighting patterns and their relative ordering, the groups of reflected lighting patterns may be matched with respective projected lines. For example, the top-most projected line may be associated with the top-most group of detected lighting patterns, the second-from-the-top projected line may be associated with the second-from-the-top group of detected lighting patterns, and so forth. In various embodiments, a pixel belonging to a group may or may not, in fact, correspond to the projected line associated with that group. The embodiments described above with reference to FIG. 2A may be used to verify whether that pixel, in fact, corresponds to the projected line. If the pixel does correspond to the projected line, then an associated depth value may be determined and used to generate a depth map; otherwise, it may be discarded and would not contribute to the depth map.

Figure 5:
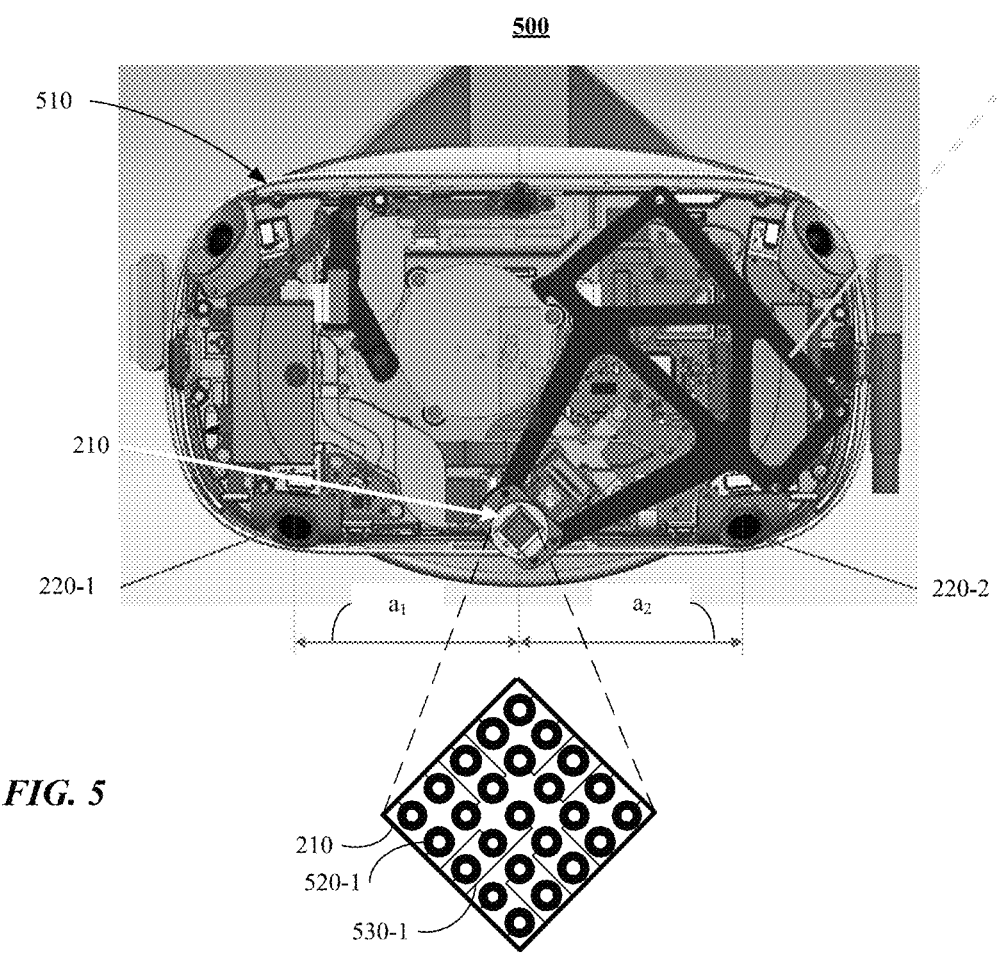
FIG. 5 illustrates an example head-mounted display.

FIG. 5 illustrates an example head-mounted display 510 that may be used to implement the embodiments described herein. System environment 500 includes head-mounted display 510, which includes detector 220-1, detector 220-2, projector 210, baseline $a_1$, and baseline $a_2$. In various embodiments, baseline $a_1$ is a distance between projector 210 and detector 220-1, and baseline $a_2$ is a distance between projector 210 and detector 220-2. In addition, projector 210 includes emitters (e.g., 520-1), and voltage supplies (e.g., 530-1).

In various embodiments, detector 220-1 and detector 220-2 (herein referred to generally as detectors 220) may be front-facing unfiltered cameras disposed on the corners of head-mounted display 510. These detectors 220 may function as inside-outside cameras for position tracking. As shown, the detectors 220 may be positioned and orientated on head-mounted display 510 to enable stereo imaging of system environment 500. In particular, detector 220-1 may be located on a right side of head-mounted display 510 (from the viewpoint of a user wearing the display 510) and generate a right image of system environment 500. Further, detector 220-2 may be located on the left side of the head-mounted display 510 and generate a left image of system environment 500.

Accordingly, the detectors 220 may detect light reflected off of objects in system environment 500. The AR application may analyze the detector data generated by the detector 220-1 and detector 220-2 when determining the position of the head-mounted display 510 in system environment 500. In particular, because each of detector 220-1 and detector 220-2 are unfiltered, each detector exhibits similar detection sensitivities to each wavelength of light. To isolate detector signals corresponding to reflected light emitted by projector 210, a computing system associated with the head-mounted display 510 may perform the embodiments described herein (e.g., the triangulation and verification process described with reference to FIG. 2A).

Functionally, in some embodiments, each of detectors 220 may include a frame buffer. A frame buffer stores detection signals generated by a detector during an interval of time. A frame is a set of detector signals obtained during an interval of time. When the interval of time is complete, the frame is stored in the frame buffer and incoming detector signals are stored in a new frame until the next interval of time elapses. The frequency with which new frames are generated may be defined as a frame rate. In various embodiments, higher frame rates enable higher resolution detection of temporal changes in system environment 500, while concurrently producing a higher energy load. On the other hand, lower frame rates provide lower resolution detection of temporal changes in system environment 500, but produce a lower energy load. In various embodiments, the AR application may configure each detector 220 to operate at the same frame rate or different frame rates. Additionally, or alternatively, the AR application may dynamically select a frame rate at which each of detectors 220 operates. The AR application may further increase and/or decrease a frame rate based on one or more characteristics of system environment 500.

In some embodiment, the AR application may configure the detectors 220 to operate at a low frame rate. For instance, the AR application may configure the detectors 220 to operate between 10 and 50 frames per second, such as e.g. 30 frames per second (fps). In such embodiments, the energy load may be low. For example, the energy load may be, for example, between 10 and 50 milliwatts, such as 30 milliwatts. Accordingly, a smaller power supply may be sufficient to enable the operation of the detectors 220. Additionally, or alternatively, the effective lifespan of a power supply (e.g., on-board or external to the head-mounted display 510) may be increased. Furthermore, the bill of materials of each detector 220 may be inexpensive. For example, the bill of materials may be between $2 and $10, such as e.g., $6.

In various embodiments, the projector 210 may include one or more emitters 520 that emit light at one or more wavelengths. In some embodiments, each emitter or groups of emitters may be individually connected to a power supply (e.g., a voltage supply). Additionally, or alternatively, one or more rows and/or one or more columns of emitters 520 may be connected to a power supply. Accordingly, the AR application may control the intensity of light emitted by one or more individual emitters, by one or more pairs of emitters, one or more rows of emitters, by one or more columns of emitters, by one or more groups of emitters, and so forth. In so doing, the AR application may increase or decrease the intensity of light produced by the projector 210 and generate different emitted patterns. The AR application may further control the direction of a light emission produced by projector 210 by selectively turning on and/or off one or more emitters 520. For example, the AR application may turn on emitters 520 located on the leftward side of projector 210 and turn off emitters 520 located on the rightward side of projector 210 when directing a beam of light to the left. Similarly, the AR application may turn on and/or off emitters 520 to detect a beam of emitted light up, down to the right, to the left, and to angles of inclination between the right, left, up, and down.

In further embodiments, the AR application may sequentially turn on and/or off emitters 520 in order to generate a light emission with a particular form (e.g., a line, a grid, etc.). The light emission produces a light projection in a region of system environment 500. By turning on and/or off emitters 520, the AR application may control the portion of the region of system environment 500 that interacts with the light projection. In particular embodiments, the AR application may configure the projector 210 to generate a light projection that sequentially scans a selected region of system environment 500. The AR application may select the scanning frequency based on various parameters such as a detector frame rate, a number of objects in the selected region, a distance to one or more objects in the selected region, a type of object, a surface feature of one or more objects, a light noise level of system environment 500, a type of light pattern emitted by projector 210, and so forth.

In various embodiments, the AR application may turn on and/or off emitters 520 to increase and/or decrease the sparseness and/or density of a projected light pattern. For example, if the AR application determines that an object being imaged is close to the head-mounted display 510, then the AR application may reduce the intensity of light emitted by each emitter 520 and/or turn off one or more emitters 520 to increase the sparseness of a light pattern emitted by projector 210. Alternatively, if the AR application determines that an object is farther away in system environment 510 and/or that system environment is a noisy environment, then the AR application may configure increase the intensity of light emitted by the emitters 520 (e.g., by increasing the voltage supply to one or more of the emitters 520) and/or increase the density of the light pattern emitted by the projector 510 (e.g., by increasing the number of emitters 520 that produce light).

The head-mounted display 510 may be worn by a user. As the user moves through system environment 500, the position of the head-mounted display 510 may change. Accordingly, as the position of the head-mounted display 510 moves through the system environment 500, the AR application may configure the projector 210 to continuously, periodically, and/or sporadically emit light into system environment 500. In addition, the AR application may configure the detector 220-1 and the detector 220-2 to continuously detected ambient light in system environment 500. The AR application may further continuously analyze data from the detector 220-1 and the detector 220-2 to isolate detector signals corresponding to light produced by projector 210 that reflected off of objects in system environment 500. The AR application may also compute depth and/or coordinate information based on the isolated detector signals and add the computed information to a system environment map.

In various embodiments, the projector 210 may be positioned at an angle to the orientation of the head-mounted device 510 (e.g., 45-degrees), such that as the user moves his or her head vertically or horizontally, the light pattern emitted by the detector sweeps the environment 500 vertically and horizontally simultaneously. Accordingly, the AR application may obtain vertical and/or horizontal information about a surface based on either vertical or horizontal movement of the head of the user.

Furthermore, the AR application may dynamically adjust various characteristics of the light pattern generated by projector 210 based on the characteristics of system environment 500. For instance, if the head-mounted display 510 is located at a position that is close to one or more objects, the AR application may reduce the output intensity of the projector 210. However, if the head-mounted display 510 moves to a position that is far away from objects in the system environment 500, the AR application may configure the projector 210 to increase an output intensity. Furthermore, if the AR application may review the current system environment map when determining how to modify the projector 210 and the detectors 220. If the AR application determines that an area of system environment 500 is well-mapped, then the AR application may reduce the frame rate of the detectors 220. However, if the AR application determines that an unmapped object is present in system environment 500 and/or that the position of a mapped object in system environment 500 has changed, the AR application may increase the frame rate of one or more of detectors 220-1 and detector 220-2.

In various embodiments, the AR application may dynamically adjust the emission intensity produced by projector 210 based on an amount of light that may be detected by an animate object (e.g., a human, an animal, etc.) located in system environment 500. In particular, the AR application may reduce an emission intensity and/or increase the sparseness of an emission pattern to keep a potential light detection intensity below a threshold intensity level. For example, if the AR application implements a dense laser pattern, then the AR application may reduce the output emission intensity to keep the potential light detection intensity below the threshold intensity level. Alternatively, in various embodiments, if the AR application implements a sparse light pattern, then the AR application may implement a higher output intensity for imaging object far away, as long as the potential light detection intensity remains below the threshold intensity level. Although the above description references, two detectors, this reference is non-limiting as one detector and/or three or more detectors are within the scope of this disclosure.

In particular embodiments, a grid light pattern may be projected onto an object, and reflections of the pattern may be captured using a camera. Distances to the object may be determined based on the captured reflections of the pattern using triangulation techniques, in which detected points in the pattern are matched to corresponding projected points in the pattern using characteristics of the pattern.

Figure 6:
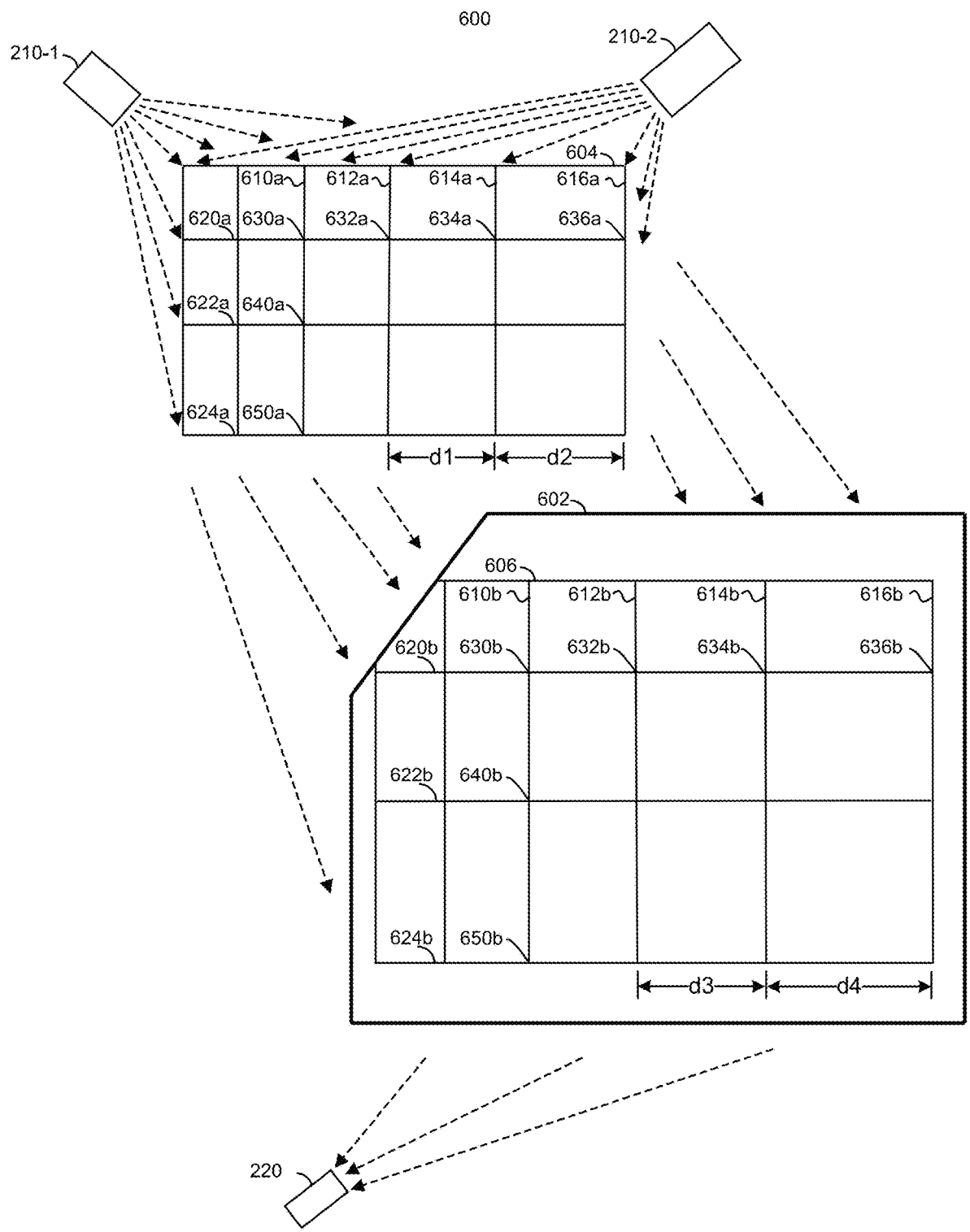
FIG. 6 illustrates example grid light patterns having varying line pitch.

FIG. 6 illustrates example grid light patterns 604, 606 having varying line pitch. A projected pattern 604 may be projected into a scene 600 by one or more projectors 210-1, 210-2, which may be mounted on a structure or device, such as a headset or head-mounted display. The projectors 210-1, 210-2 may each be mounted at fixed baseline distances from the camera. Projector 210-1 1 may project light in the form of projected lines 620a-624a, and projector 210-2 may project light in the form of projected lines 610a-616a. Note that although a particular number of projected lines are shown in this example, each projector may project any number of lines. The projected lines 610a-616a may intersect the projected lines 620a-624a and may form a projected grid pattern 604. The projected lines 620a-624a are referred to herein as "horizontal" lines and the projected lines 610a-616a are referred to herein as "vertical" lines. The terms "horizontal" and "vertical" are used for explanatory purposes and do not necessarily mean that the lines are horizontal or vertical. At least a portion of the projected grid pattern 604 may be incident on one or more objects 602, be reflected by the objects 602, and form a reflected grid pattern 606 on the object 602. The reflected grid pattern 606 may be a distorted variation of the projected grid pattern 604. The reflected grid pattern 606 may have a shape based on the shape of the projected grid pattern 604 and the distances between the projector(s) and the points on the objects from which the projected lines were reflected. For example, there may be curves or breaks in the reflected lines.

In particular embodiments, projected junctions 630a-636a may be formed at the intersections of the vertical projected lines 610a-616a and the horizontal projected lines 620a-624a. The junctions 630a-636a, 640a, 650a may be reflected by the objects 602 and be detected by the camera 220 as respective detected junctions 630b-638b, 640b, 650b. Each point along a detected line 620b may correspond to a point along a corresponding projected line 620a, and each detected junction 630b between detected intersecting lines may correspond to a projected junction 630a between the projected lines that correspond to the detected intersecting lines. Since a detected junction 630b may be a point on two different detected lines 610b, 610b, the corresponding point at the projected junction 630a may be identified more reliably than a point on a single line.

In particular embodiments, a camera 220 may capture one or more images of the reflected grid pattern 606. The camera 220 may detect a first set of detected lines 620b-624b, which may be reflections of the lines 620a-624a, and a second set of detected lines 610b-616b, which may be reflections of the lines 610a-616-a. The detected lines 610b-616b, 620b-624b in the image captured by the camera may be represented as pixels in the captured images. Each pixel may correspond a point on the surface of one of the objects 602.

As introduced above with reference to FIGS. 2A and 2B, a distance to a point on an object may be determined using triangulation calculations based on identified light points on the surface of an object 602 that form the detected patterns 610b-616b, 620b-624b, and known camera and projector locations. The triangulation calculations may involve identifying a correspondence between one or more features of the projected grid pattern 604, such as a line 620a or a junction 630a, and one or more features of the reflected grid pattern 606, such as a line 620b or a junction 630b, and use the locations of the identified features of the projected and reflected patterns to calculate a distance to the object 602, or to points on the surface of the object 602. The projected lines 610a-616a, 620a-624a may be encoded with characteristics that may be used to identify particular projected lines from the corresponding detected lines 610b-616b, 620b-624b. The characteristics may be, for example, line intensity, line pitch, line pattern, and so on.

One or more characteristics of the projected grid lines 620a-624a, 610a-616a, such as the intensity of each line 620a, and/or the pitch (spacing) between each pair of adjacent projected lines 620a, 622a, may be unique (at least within a particular projected grid pattern 604), so that each projected line may be associated with unique values of these characteristics. These characteristics may be reflected by the object 602 and detected as detected characteristics. The detected characteristics may be identified in the detected lines 620b-624b, 610b-616b using the camera 220. The detected characteristics may be used to identify the projected line 620a that corresponds to a particular detected line 620b by finding a projected line 620a having a projected characteristic that matches the detected characteristic of the detected line 620b.

In particular embodiments, as described above, each projected line's characteristic(s), e.g., intensity, may be different from that of other projected lines in the projected grid pattern 604, or at least from that of other adjacent or nearby lines. The correspondence between the projected lines and the detected lines may be determined by matching particular projected lines to particular detected lines based on their associated characteristics. For example, the projected grid pattern 604 has a line pitch characteristic that varies, as can be seen in the increasing distances between lines toward the bottom right of the projected grid pattern 604. That is, distances between pairs of adjacent lines may be different for different pairs of adjacent projected lines. As an example, the distance between projected lines 612a and 614a, which may be referred to as d1, is different from the distance between projected lines 614a and 616a, which may be referred to as d2. These two distances may be used to identify the detected line 622b that corresponds to the projected line 622a. For example, a ratio of d1 to d2 may be calculated as d1/d2 and compared to ratios of distances between lines in the detected grid pattern 606, such as a ratio of d3 to d4, where d3 is the distance between detected lines 612b and 614b, and d4 is the distance between detected lines 614b and 616b. If the spacing of the projected lines 620a-624a is configured so that the ratio d1/d2 is unique in the projected grid pattern 604 when compared to ratios calculated for other adjacent pairs of lines in the grid pattern 604, then a corresponding detected line 622b may be identified by computing the corresponding ratios in the detected grid pattern 606 and finding a detected ratio d3/d4 that matches (e.g., is equal to or within a threshold tolerance of) the ratio d1/d2. The ratio d3/d4 may be a ratio of the distances between the detected lines 612b and 614b (d3) and 614b and 616b (d4).

In particular embodiments, each projected line 610a may be continuous. Each projected line 610a may have endpoints, in which case the line may be continuous between its endpoints. Since the projected patterns 604 are continuous (at least to their outer boundaries, for patterns that are of a particular size), an abrupt change in depth in the real-world environment may create a discontinuity in the detected grid pattern 606. Changes in depth in the real-world environment may be detected by identifying discontinuities in the reflected pattern. Changes in characteristics along the reflected lines may also indicate that junctions are disconnected. When a projected line 610a crosses an edge of an object 602, the corresponding detected line 610b may have a discontinuity that corresponds to a location of the edge of the object 602. This discontinuity may be used to detect object boundaries. For example, the the top left of the object 602 has a diagonal boundary that crosses the detected pattern 606. The topmost and leftmost lines of the projected pattern 604 are truncated in the detected pattern 606, and the junction between the leftmost and topmost lines at the top left corner of the projected pattern 604 does not have a corresponding detected junction in the detected pattern 606. The absence of this junction from the detected pattern 606 and the presence of nearby junctions in the detected pattern 606, such as the junction between detected lines 620b and the leftmost line of the detected pattern 606, indicates that there is an edge of the object 602 near the latter junction.

In particular embodiments, a junction 630 may be used to uniquely identify a given pair of intersecting lines 610, 620. A correspondence between a detected junction 630b and a projected junction 630a may be determined based on characteristics of the junction, such as the relative intensities of the lines 610, 620 that intersect at the junction 630 and the relative spacing, horizontally and vertically, between the lines 610, 620 that intersect at the junction and other lines, e.g., lines 612, 622. The characteristics may be determined for a projected junction 630a using lines 610a, 620a and, optionally, other lines, e.g., lines 612a, 622a. The projected characteristics determined for the projected junction 630a may be compared to or correlated with detected characteristics of a detected junction 630b using detected lines 610b, 620b and, optionally, other lines, e.g., detected lines 612b, 622b.

In particular embodiments, the detected characteristics of detected lines, such as the detected intensity or the distance between detected lines, are not necessarily the same as the corresponding projected characteristics, but may be sufficiently similar so that a corresponding projected line or junction may be determined by comparing multiple projected and detected characteristics or using tolerances so that characteristics that are not equal but are within a predetermined tolerance of each other, e.g., 1%, 3%, 5%, or other suitable tolerance, are determined to be equal. For example, if the intensity of each projected line differs by 10% from the adjacent projected lines, then the reflected line that corresponds to (e.g., matches) a particular projected line having an intensity value of 20 may be identified by searching the reflected lines for a line having an intensity of 20 plus or minus a tolerance, such as 5%.

In particular embodiments, the line structures of the projected and detected patterns may be used to identify lines that have a non-matching characteristic but are between pairs of other lines for which characteristics do match. For example if 10 horizontal lines are projected in a grid, with the first line having an intensity of 1, the second 10, and so on, up to the tenth line having an intensity of 100, then the projected line that corresponds to a particular detected line having a detected intensity value of 23 may be identified by searching the projected lines for a projected line having an adjacent projected line on one side less than 23 and an adjacent projected line on the other side greater than 23.

In particular embodiments, there may be ambiguity in the determination of which projected junction 630a corresponds to a particular detected junction 630b. For example, the reflected intensities of two adjacent lines may be difficult to distinguish in certain situations. Ambiguity at a particular junction may also be resolved or reduced using determinations made for surrounding junctions. The detected attributes (e.g., intensity, pitch, etc.) or determined location of a detected junction may be propagated to neighboring junctions. The detected attributes or determined location of each junction may have associated confidence values, and the confidence values may be propagated to neighbor junctions along with the detected attributes or determined locations.

In particular embodiments, the depth of an object 602 in an image may be determined by identifying a detected junction 630b at which detected vertical and horizontal lines 610b and 620b intersect on the object 602 in the image. The lighting characteristics of the detected junction 630b may then be used to identify the corresponding projected junction 630a, which may be used to triangulate the depth (e.g., distance to) the point on the object 602 that corresponds to the detected junction 630b. The lighting characteristics may be understood as information encoded in the projected junction, and may include the intensities of the detected lines that intersect at the junction 630b and their corresponding intensities, the distances to neighboring lines, and temporally-encoded information, which is described with reference to FIG. 11. The lighting characteristics may be propagated to other junctions according to the lines between junctions. The propagation may be performed in steps, e.g., by propagating the lighting characteristics that have been determined or received (from another junction) at a junction to each adjacent junction (e.g., first-degree neighbor) at a suitable time, e.g., after each frame, or after each N frames. In this way, information may propagate between junctions in a localized manner. The propagation of information across the graph of junctions may converge quickly. Reliability information (e.g., confidence values) about the determinations may also be propagated. Reliability thresholds may be used to decide whether to propagate information to other junctions. The reliability information may be used to form a weighted graph, for example, in which the nodes correspond to junctions and the edges correspond to lines between junctions The depth of a detected junction 630b may be computed using triangulation based on the information available at the junction 630b, which may include information propagated from other junctions, such as attributes and locations or depths of nearby junctions.

Figure 7:
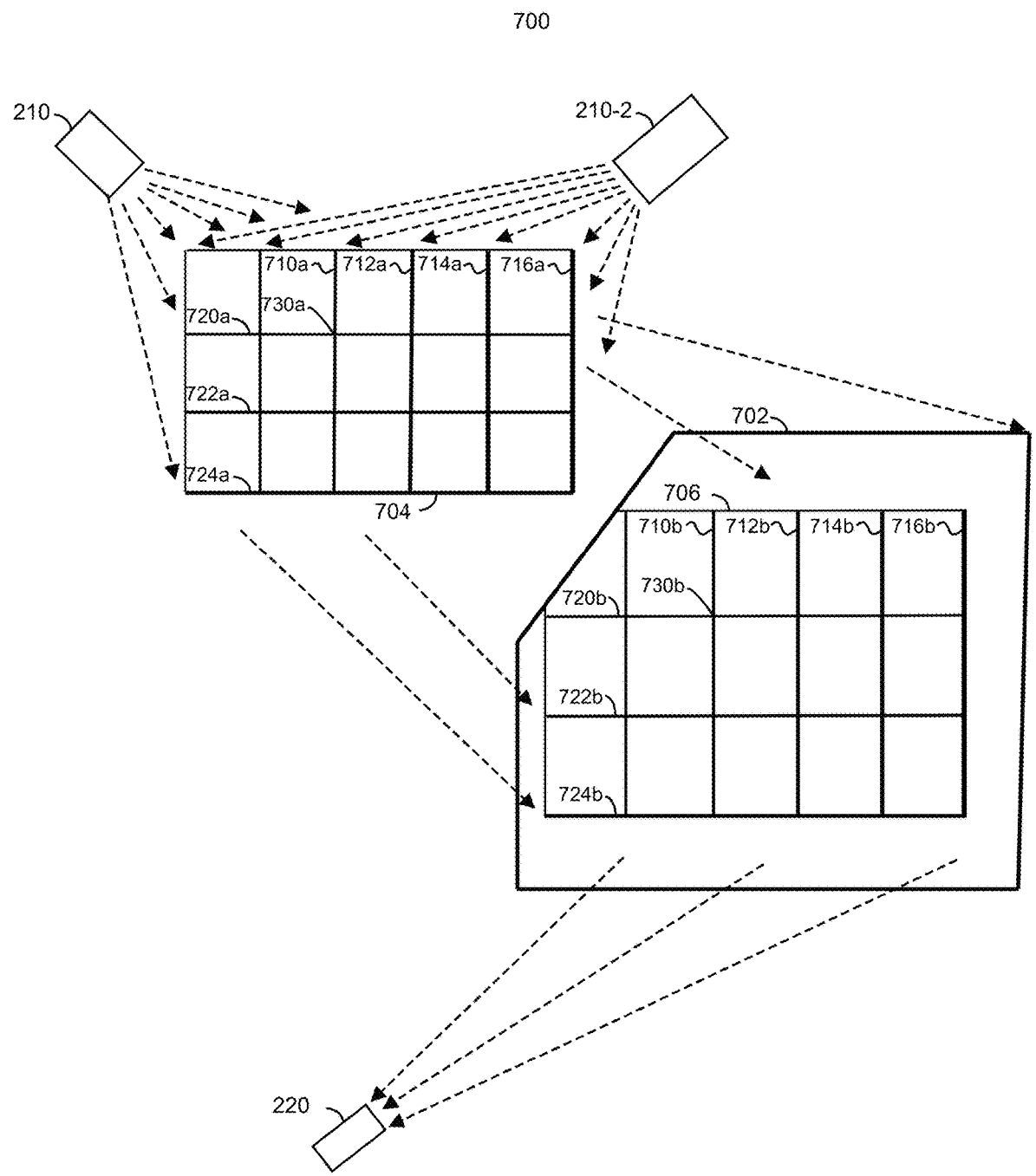
FIG. 7 illustrates example grid light patterns having varying line intensities.

FIG. 7 illustrates example grid light patterns 704, 706 having varying line intensities. As can be seen in FIG. 7, the intensity of each line in the projected pattern 704 may be greater than the intensity of the line above it (for horizontal lines) or to the left of it (for vertical lines). As an example, if each of the projected lines 710, 720 has a unique intensity, then when a detected junction 730b is detected by the camera 220, the intensities of the intersecting detected lines 710b, 720b that form the junction 730b may be detected by the camera and used to identify the specific projected junction 730a that corresponds to the detected junction 730b by identifying intersecting projected lines that have corresponding intensities. For example, if the projected line 710a has an intensity of 20 and the projected line 720a has an intensity of 30, then a detected line 710b having an intensity of 20 may correspond to the projected line 710a and and a detected line 720b having an intensity of 30 may correspond to the projected line 710b. As another example, the intensity may vary in other ways, e.g., the intensity of each line may be less than the intensity of the line above it (for horizontal lines) and less than the intensity of the line to the left of it (for vertical lines). The intensity of a projected lines may increase across the projected grid pattern 704, so the intensity of a projected line 712a may be set based on a value determined by multiplying the intensity of another line 710a by factor such as, e.g., 1.25, 1.5, 2.0, 0.5, or the like. As another example, the intensity of a projected line 712a may be set based on a counter value that is incremented for each projected line, or based on another value that is unique for each projected line 710, 720 in the projected grid 704, such as a randomly-selected value that is unique in the projected grid 704.

Figure 8:
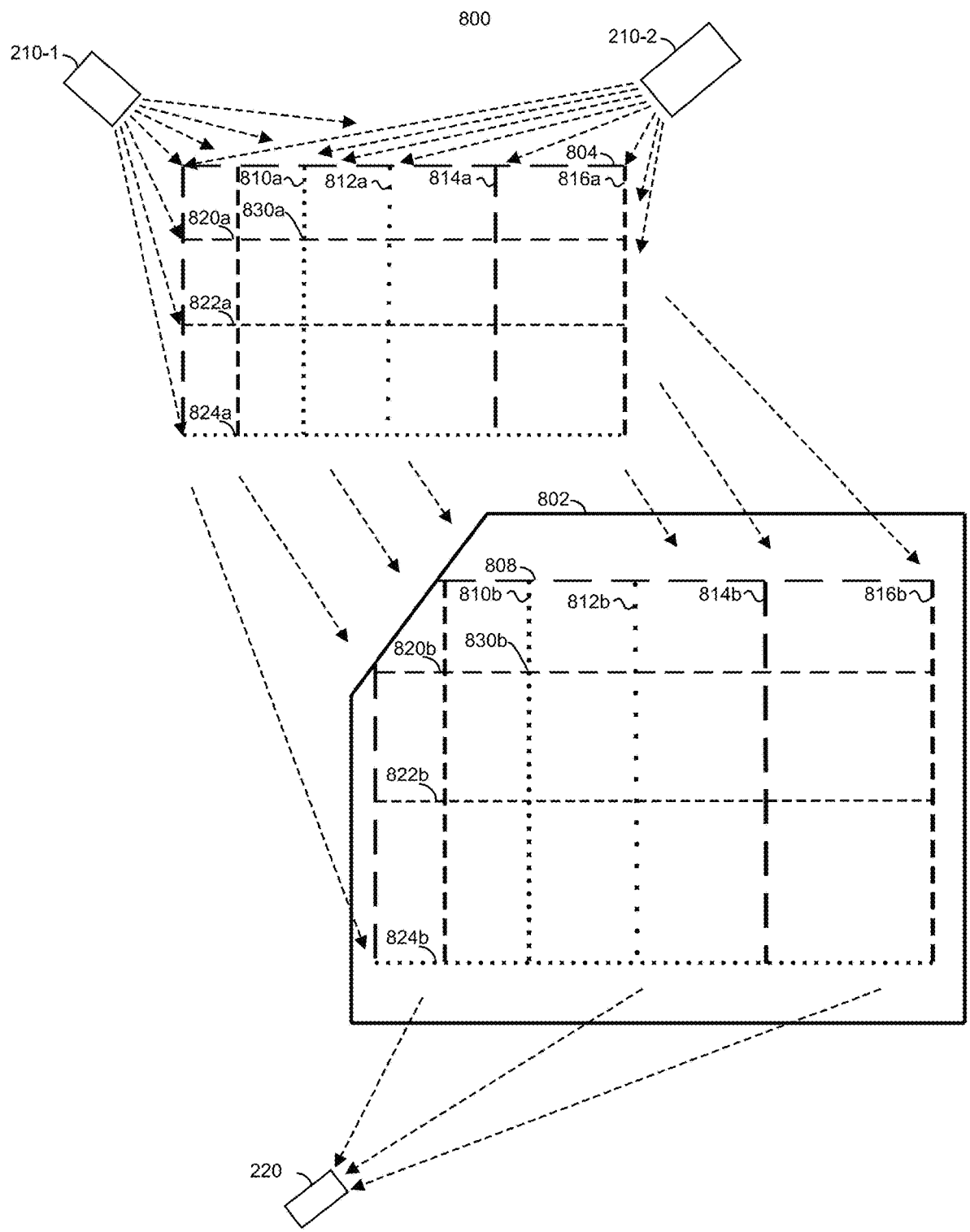
FIG. 8 illustrates example grid light patterns having varying line patterns.

FIG. 8 illustrates example grid light patterns 804, 806 having varying line patterns. As can be seen in FIG. 8, each projected line 810a, 812a, 814a may have a different line pattern. Each the line patterns may be, e.g., dots arranged to form a line of dots (e.g., small circles), a dashed line, or other shapes arranged in a line. The line pattern may be uniform, e.g., having a constant distance between shapes, and the shapes may be of the same size. Alternatively, the distance between shapes or the size of the shapes may vary. As an example, the distance between shapes of each projected line 810a may be greater than the distance between shapes of an adjacent projected line 810b, or the size of shapes in each line may be greater than the size of shapes in an adjacent line.

As an example, if each of the projected lines 810a, 820a has a unique line pattern (e.g., size and/or shape of elements such as dashes or dots), then when a detected junction 830b is detected by the camera 220, the patterns of the intersecting detected lines 810b, 820b that form the junction 830b may be detected by the camera 220 and used to identify the specific projected junction 830a that corresponds to the detected junction 830b by identifying intersecting projected lines that have corresponding patterns. For example, if the projected line 810a has a dashed line pattern with the length of each dash being twice the length of the space between each pair of dashes, then a detected line 810b having the same dashed line pattern corresponds to the projected line 810a.

Figure 9:
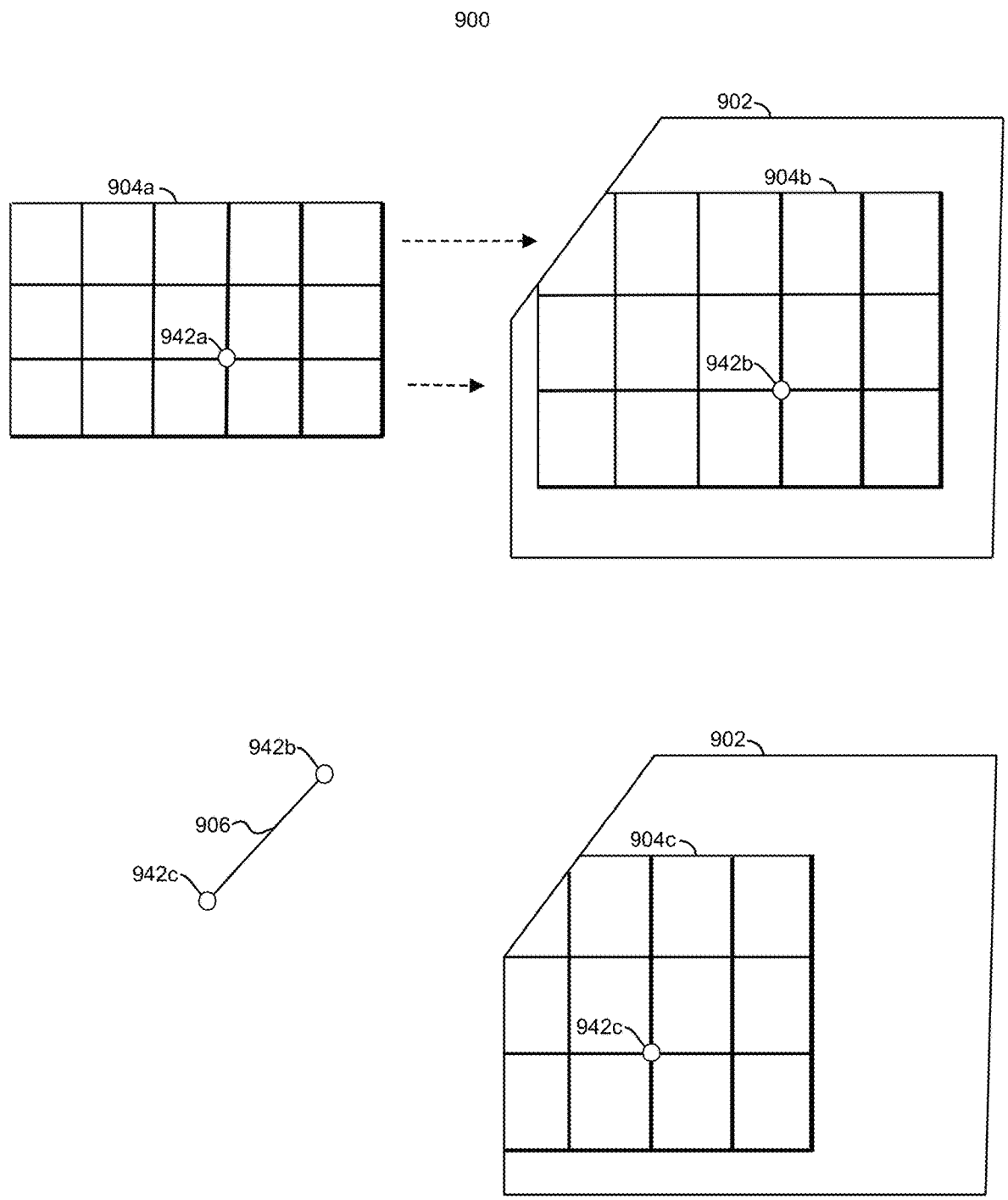
FIG. 9 illustrates movement of a grid light pattern and a corresponding epipolar line.

FIG. 9 illustrates movement of a grid light pattern and a corresponding epipolar line. In particular embodiments, at a particular junction point, the horizontal and vertical lines agree on a depth. When there is a movement in depth, e.g., as a result of movement of the device (which may be detected by, for example, a change in GPS coordinates) or movement of an object in the scene (which may be detected by, for example, a change in the image captured by the camera), the point of intersection of the reflected lines may move. A line between an initial point at which the lines intersected prior to the movement and a subsequent point at which they intersect after the movement is referred to herein as an epipolar line 906. The epipolar 906 may correspond to a path, and the two junctions may only be located on that path. If there are N lines in one direction and M in the perpendicular direction, then there are N×M junctions that have certain paths they can move through. These paths should have as little in common with one another as possible. Then if a point is located on a particular path, the corresponding two junctions may be determined.

In particular embodiments, given the baseline distances (e.g., the distance between the first and second projectors), the junction may be one of a relatively small number of possible choices, because only a relatively small number of horizontal and vertical line pairs may intersect at that point. To resolve which lines correspond to the junction, there is no need to check all junctions in the grid (a grid of M horizontal lines by N vertical lines may include M×N junctions). Only the subset of junctions that could potentially correspond to the detected point in the image need be searched. The subset may include junctions on or near an epipolar line that intersects the initial location of the junction. For example, if there are 5 vertical/horizontal line pairs that may hit the point, then only those pairs need be searched to identify the pair that corresponds to the point. Further, the line for a vertical projector and camera pair may only move by or up to a certain distance based on a depth change. Similarly, the line for the horizontal projector and camera pair may only move by or up to a certain distance based on the same depth change. The combination of the two, e.g., the intersection of the lines, may move in a constrained way, which corresponds to an epipolar. The calibration (horizontal and vertical baselines) may produce two epipolar constraints, which may determine a line through which the junction may move, e.g., the epipolar. This constraint may narrow down the set of possible projected junctions that correspond to a reflected junction. The intensity and pitch coding described above may also be used to narrow down the possible projected junctions that correspond to the reflected junction if there is ambiguity in identifying the projected junction. The encoding and epipolar constraints may be combined to narrow the possibilities to a single projected vertical-horizontal line pair (e.g., junction) to which a reflected vertical-horizontal line pair may correspond.

As an example, when a movement of the device or of an object in the scene captured by the camera is detected, a reflected junction that was detected at an initial point (prior to the movement) may be detected at a subsequent point (e.g., pixel) in an image (subsequent to the movement). To determine whether the reflected junction detected at the subsequent point corresponds to the junction that was detected at the initial point (e.g., is the same reflected junction that was detected at the initial point, and therefore corresponds to the same projected junction as the junction detected at the initial point), the location of the subsequent point may be compared to an epipolar line that intersects the initial point. If the subsequent point is on (or sufficiently near) the epipolar line, then the reflected junction detected at the subsequent point may correspond to the same reflected junction that was detected at the initial point, and therefore to the same projected junction as the reflected junction that was detected at the initial point.

Referring to FIG. 9, a projected grid light pattern 904a including a junction 942a is projected onto an object 902. The grid light pattern 904 includes horizontal lines projected by a first projector. The horizontal grid lines of the pattern 904a are projected by a first projected and the vertical grid lines are projected by a second projector. A reflection of the projected pattern 904a may be detected by a camera and used to generate a detected pattern 904*b* having a detected junction location 942*b* that corresponds to the projected junction 942*a*. Subsequently, motion occurs in which the object 902 moves to the right and upward relative to the camera, so the junction location moves to a second detected junction location 942*c*. The motion of the junction from location 942*b* to location 942*c* may be along an epipolar line 906. Further, as the depth to an object changes, the detected lines from the projector that projects horizontal lines may move up or down in the image, and the detected lines from the projector that projects vertical lines may move left or right in the image.

Figure 10:
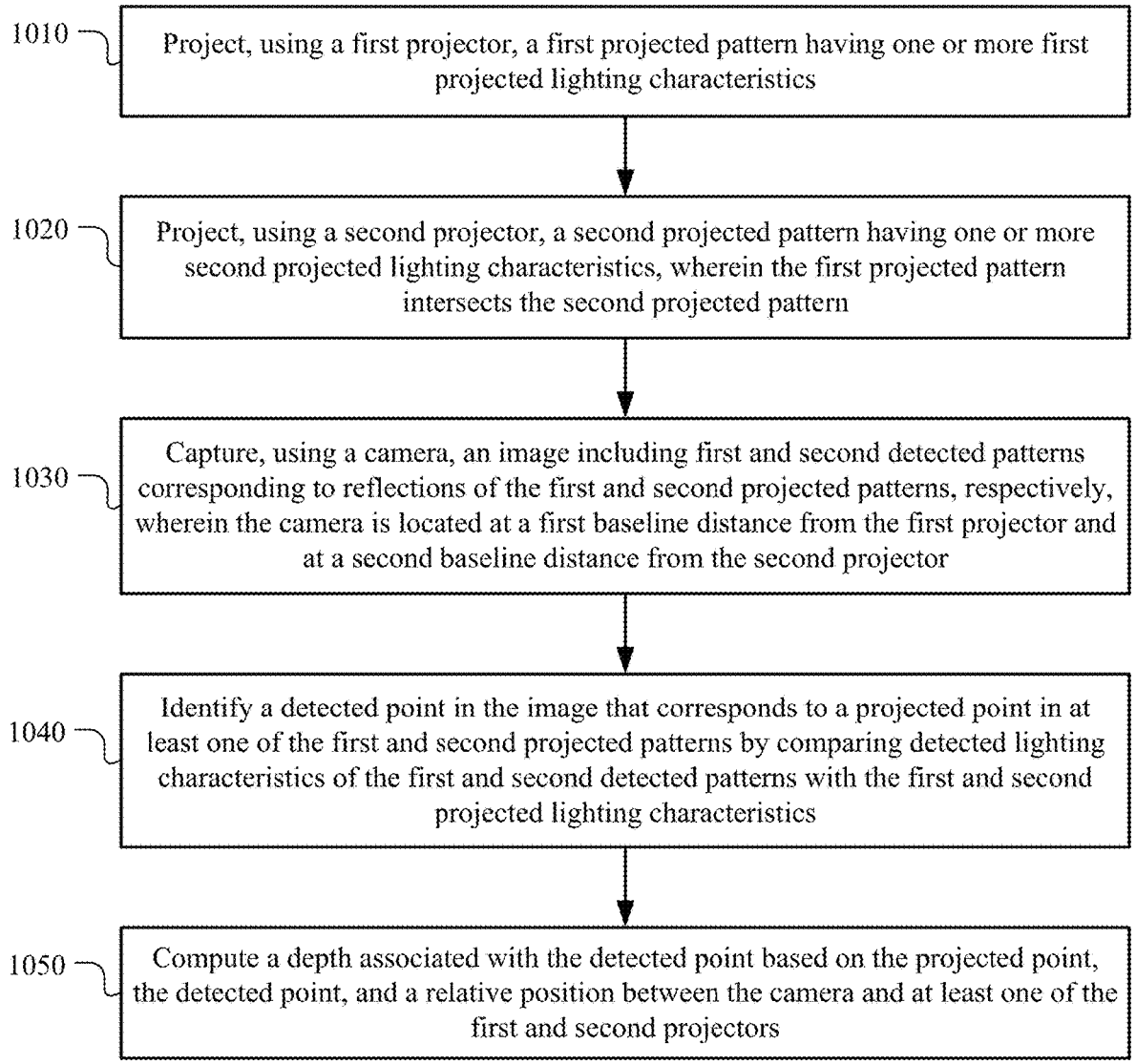
FIG. 10 illustrates an example method for determining depth using grid light patterns.

FIG. 10 illustrates an example method 1000 for determining depth using grid light patterns. The method may begin at step 1010, where the method may project, using a first projector, a first projected pattern having one or more first projected lighting characteristics. At step 1020, the method 1000 may project, using a second projector, a second projected pattern having one or more second projected lighting characteristics, wherein the first projected pattern intersects the second projected pattern. At step 1030, the method 1000 may capture, using a camera, an image including first and second detected patterns corresponding to reflections of the first and second projected patterns, respectively, wherein the camera is located at a first baseline distance from the first projector and at a second baseline distance from the second projector.

At step 1040, the method 1000 may identify a detected point in the image that corresponds to a projected point in at least one of the first and second projected patterns by comparing detected lighting characteristics of the first and second detected patterns with the first and second projected lighting characteristics. At step 1050, the method 1000 may compute a depth associated with the detected point based on the projected point, the detected point, and a relative position between the camera and at least one of the first and second projectors.

In particular embodiments, the first projected pattern may include a plurality of first projected lines, and the second projected pattern may include a plurality of second projected lines. The detected lighting characteristics may include a plurality of first reflected lines and a plurality of second reflected lines that intersect the first reflected lines, and the first and second reflected lines may be based on reflections of the first and second projected lines from a surface of an object. A detected point on the image that corresponds to a projected point in one or more of the first and second projected patterns may be identified by identifying a reflected junction at which one of the first reflected lines intersects one of the second reflected lines.

In particular embodiments, the reflected junction may be associated with one or more reflected junction characteristics. The projected junction may correspond to the reflected junction, such that the projected junction is at an intersection of one of the first projected lines and one of the second projected lines, wherein the projected junction is associated with one or more projected junction characteristics determined based on (1) the one or more first projected lighting characteristics associated with the first projected pattern and (2) the one or more second projected lighting characteristics associated with the second projected pattern, and wherein one or more of the projected junction characteristics match one or more of the reflected junction characteristics. The depth for the detected point may be determined based on a depth associated with the reflected junction, which may be determined based on the camera, at least one of the projectors, the reflected junction, and the projected junction that corresponds to the reflected junction.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for determining depth using grid light patterns including the particular steps of the method of FIG. 10, this disclosure contemplates any suitable method for determining depth using grid light patterns including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

In particular embodiments, depth sensing may be performed by projecting a pattern, such as a line, and varying a projected lighting characteristic of the pattern, such as lighting intensity, over a time period according to a temporal lighting-characteristic pattern, which may be associated with the projected pattern. The temporal lighting-characteristic pattern may be a pattern of lighting intensities, for example. A camera may capture the projected pattern, e.g., the line, in a plurality of images over the time period to form a detected pattern, and determine a detected temporal lighting characteristic pattern, e.g., a pattern of lighting intensities, such as 3, 5, 7, and 9, based on the detected pattern. The depth sensing system may identify the particular projected pattern that corresponds to a given detected pattern by comparing the detected temporal lighting characteristic pattern to the projected temporal lighting characteristic patterns that were used for projected patterns. The projected pattern that has the same temporal lighting characteristic pattern, e.g., 3, 5, 7, and 9, may be the particular projected pattern that corresponds to the given detected pattern.

Figure 11:
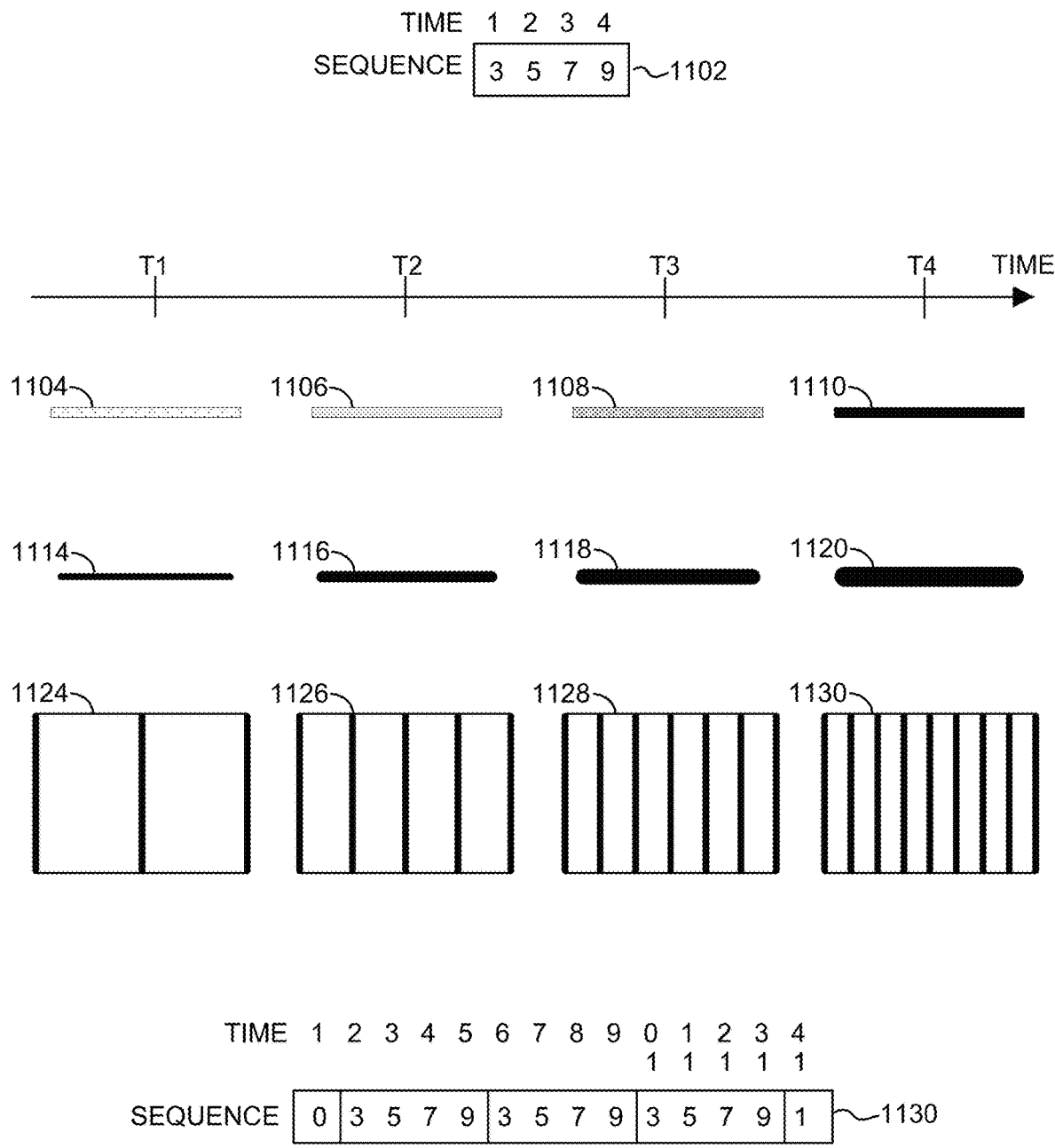
FIG. 11 illustrates example temporal lighting patterns.

FIG. 11 illustrates example temporal lighting patterns 1102-1130. A lighting pattern for which one or more characteristics vary over time, e.g., according to a temporal lighting characteristic pattern, may be projected using a suitable type of projector. The projected lighting characteristic pattern may be projected as lighting characteristics of one or more shapes. The lighting characteristics may be, e.g., intensities of shapes, geometric characteristics of shapes, such as distances between lines, or other suitable characteristics of one or more projected shapes. The shapes may be, e.g., grid of lines, and the shapes may have the lighting characteristics specified by the pattern. One or more shapes may be projected at different times using different lighting characteristics. A camera may capture reflected light beams in a sequence of images and identify a detected pattern of temporal lighting characteristics based on the images. The characteristics of previously-projected shape patterns of projected lighting characteristics may be compared to the characteristics of detected patterns in a sequence of captured images to find the image pixels that correspond to the projected beams, and the correspondence may be used to determine the depth of each pixel by triangulation based on the locations of the corresponding image pixels. Distances to the object may be determined based on the reflections detected by the camera using triangulation techniques in which the correspondence between lines or other patterns detected by the camera and projected lines may be identified by matching the pattern of temporal lighting characteristics of the beams received over time to the known patterns of temporal lighting characteristics of the projected beams to identify the projected beam that corresponds to the detected lines or other patterns.

In particular embodiments, the temporal lighting characteristics may be light intensity values. The intensities used by the projector may be determined using a temporal lighting characteristic pattern, which may be sequence of values such as an example sequence 1102. The example sequence 1102 has the values 3, 5, 7, 9. Each value in the sequence may be projected for a duration of time, e.g., 5 milliseconds, 100 milliseconds, or other appropriate duration. Time values are associated with the sequence 1102 in FIG. 11 to illustrate that each number in the sequence may be used as the intensity of a projected line at a different time. Thus, for example, a line or other shape may be projected having an intensity of 3 for a duration of T milliseconds, after which the intensity may be changed to 5 for another T milliseconds, then to 3 for another T milliseconds, and to 9 for another T milliseconds. The pattern may then repeat. The duration of time for which each intensity is projected may correspond to the rate at which frames are captured, in which case the intensity of each line may vary through the course of a sequence of frames. The time to project the pattern may be referred to as a time period of the pattern. In this example, the time period of the pattern 1102 is 4 T milliseconds. A frame may be captured every T milliseconds so that each intensity is captured in a separate frame. The pattern may then be determined based on the captured frames. For example, a detected pattern having an associated intensity may be determined based on the intensity of a detected line or other feature in each frame. The detected temporal pattern in this example is 3, 5, 7, 9. The detected temporal pattern may then be used to identify each projected line. In this example, the detected pattern 3, 5, 7, 9 may be compared to the previously-projected pattern 3, 5, 7, 9, and the line projected when the pattern 3, 5, 7, 9 was projected may be the projected line that corresponds to the detected line. Different sequences may be used for different projected lines. The sequence may be a unique sequence relative to other sequences projected by the depth sensing system over a period of time, e.g., during a particular hour or day. Since the sequence is different from other sequences that may be detected during the period of time, the projected shape pattern 604 than corresponds to the sequence may be identified by finding a projected pattern having the same sequence as the detected pattern 606. After capturing a number of frames that correspond s to the sequence length, the projected line that corresponds to a particular detected line may be identified by comparing the detected sequence to projected sequence.

Since the intensity values determined from camera frames may be imprecise, the intensities of a number of consecutive lines may be matched to a subsequence of the sequence of known projected intensities that were encoded by the projector. This number of consecutive lines to be matched may be increased to increase confidence that the correspondence has been identified correctly. That is, the intensity value of each projected beam may correspond to a number in a predetermined sequence in which subsequences of a particular length N (e.g., 3 consecutive numbers) are unique. For N consecutively-detected lines, the corresponding projected lines may be identified by finding a subsequence of the same N consecutive numbers in the predetermined sequence.

FIG. 11 illustrates three different projected patterns that encode the temporal lighting characteristic pattern 3, 5, 7, 9. Four lines 11104-1110 of different intensities encode the pattern 3, 5, 7, 9 in the line intensities. The line 1104 has an intensity of 3, and is projected starting at a time T1 for a duration of time. The line 1106 has an intensity of 5 and is projected starting at a time T2 for the duration of time. The line 1108 has an intensity of 7 and is projected at a time T3 for the duration of time. The line 1110 has an intensity of 9 and is projected at a time T4 for the duration of time.

As another example, four lines 1114-1120 of different widths encode the pattern 3, 5, 7, 9 in the line widths. The line 1114 has a width of 3 (e.g., 3 pixels), the line 1116 has a width of 5, the line 1118 has a width of 7, and the line 1120 has a width of 9. Each line width may be projected for a duration of time. Each line may be projected for the same duration of time. Alternatively, the lines 1114-1120 may be projected for different time durations, and the detection of transitions between different characteristics in a pattern may be done based on changes in the temporal lighting characteristics. For example, when an intensity of a projected pattern changes, the camera may advance to the next frame.

An example projected pattern 1124-1130 includes parallel lines of different densities based on the sequence 1102. A first projected pattern 1124 has 3 lines, a second projected pattern 1126 has 5 lines, a third projected pattern 1128 has 7 lines, and a fourth projected pattern 1130 has 9 lines. The first pattern 1124 may be projected for a duration of time, followed by the second pattern 1126 for the duration of time, the third pattern 1128 for the duration of time, and the fourth pattern 1130 for the duration of time. The total time period is 4 T if each duration of time is of length T time units. Each of the projected patterns 1124-1130 may be captured by a camera, and the numeric value encoded in each projected pattern may be extracted to generate the detected pattern of temporal lighting characteristic values. The depth sensing system may count the number of non-intersecting lines in each projected pattern 1124-1130, and may thus determine the number 3 from the first pattern 1124, 5 from the second pattern 1126, 7 from the third pattern 1128, and 9 from the fourth pattern 1130.

An example repeating detected temporal lighting characteristic pattern 1130 includes the number 0 at time 1, followed by the three successive occurrences of the pattern 3579, and the number 1 at time 14. The first occurrence is at time 2-5, the second at time 6-9, and the third at timed 10-13. The projected lighting characteristic pattern may be repeated in this way so that it may be detected at a wider range of times. The pattern may be repeated continuously until a different pattern is selected. The depth sensing system may identify the pattern as a repeating sequence 3, 5, 7, 9 based on the pattern 1130.

In particular embodiments, a projector may be mounted on a structure or device, such as a headset, at fixed distances from the camera. To project light of different intensities, the projector may use lines of emitters, and there may be a different number of emitters on each line, so that each line projects a different intensity. Alternatively, addressable illuminators may be used, in which different currents can be applied to the emitters to generate different intensities.

Temporal intensity encoding may be combined with other encoding techniques, such as using different intensities for different simultaneously-projected lines (projected to different locations), or varying the distance between projected lines. These encodings may be used to resolve ambiguity about where a particular point detected in a camera image is in the pattern and thereby determine the depth of that point using triangulations.

In particular embodiments, a projector may project a pattern, referred to herein as a projected pattern, which may include one or more shapes, such as lines or other shapes. Each projected pattern may be associated with a projected temporal lighting characteristic pattern that may specify how a lighting characteristic of the projected pattern changes over time. As an example, two different projected patterns, Pat1 and Pat2, may be projected. Pat1 may be a line, and may have an associated temporal lighting characteristic pattern 1, 3, 5, 7. Pat2 may be a dot (e.g., a point of light) and may have an associated temporal lighting characteristic pattern 2, 4, 6.

A camera may capture images that contain the projected patterns. For example, a camera may capture an image of both the line of Pat1 and the dot of Pat2. The camera may capture images at a particular frame rate, e.g., 30 frames per second or other suitable rate. The projector may project pattern values at the same rate. Thus, the projector may project the line having an intensity of 1 and the dot having an intensity of 2 at time T1 for a duration of time that corresponds to 30 frames per second. The camera may capture the image containing the line having intensity 1 and the circle having intensity 2, followed by another frame containing the line having intensity 3 and the dot having intensity 4. The depth sensing system may attempt to match these two sequences to previously projected sequences. The previously projected sequences are 1, 3, 5, 7 and 2, 4, 6, so which neither of the detected sequences 1, 3 and 2, 4 match. The projector may continue by projecting the line with an intensity of 5 and the dot with an intensity of 6. The depth sensing system may compare the detected sequences to previously-projected sequences, and may find a match of for the pattern 2, 4, 6, which was used to project the dot. The sequence 2, 4, 5 is associated with a projected dot pattern, so the projected dot pattern is identified as the projected pattern that corresponds to the detected dot pattern.

When a depth is determined, a confidence level may be associated with each pattern. If the confidence level is low, then the line can be shut down or projected differently in the next frame, e.g., at a different frequency that can be detected. This technique may be used for dark objects or when there is a lot of noise, to validate the determined depth and achieve a desired level of accuracy.

Each projected line may project a unique pattern, in a specific sequence, that can be used to detect the line over time. Thus, if (1) each line has a unique pattern, e.g., a pattern of intensity, that changes over time, (2) a projector iterates through the pattern fast enough, (3) the camera's frame rate is high enough to match the projector's iteration rate, and (4) objects in the scene are stationary or moving slowly enough, then the line can be uniquely identified based on the unique pattern. Because of the unique pattern, and the slow or nonexistent movement, the depth of the line can be resolved based on local information (that is, the detected pattern of the line). The frame rate needed to identify the unique pattern may be based on the speed of movement in the scene, so there is a trade-off between movement and time. If the scene is stationary or has only slow movement, then a relatively low frame rate, e.g., 50 FPS, may be sufficient. For scenes that can have faster movement, higher frame rates are needed, e.g., 500 to 1000 FPS, since there is not ordinarily movement in nature during a 1 or 2 millisecond interval. The number of periods of the pattern that need to be detected may correspond to the density of the pattern.

The depth of the line can be resolved based on the detected pattern of the line when the pattern changes at sufficiently high rate and slowing down the rate at which the pattern changes depending on the camera's frame rate.

Figure 12:
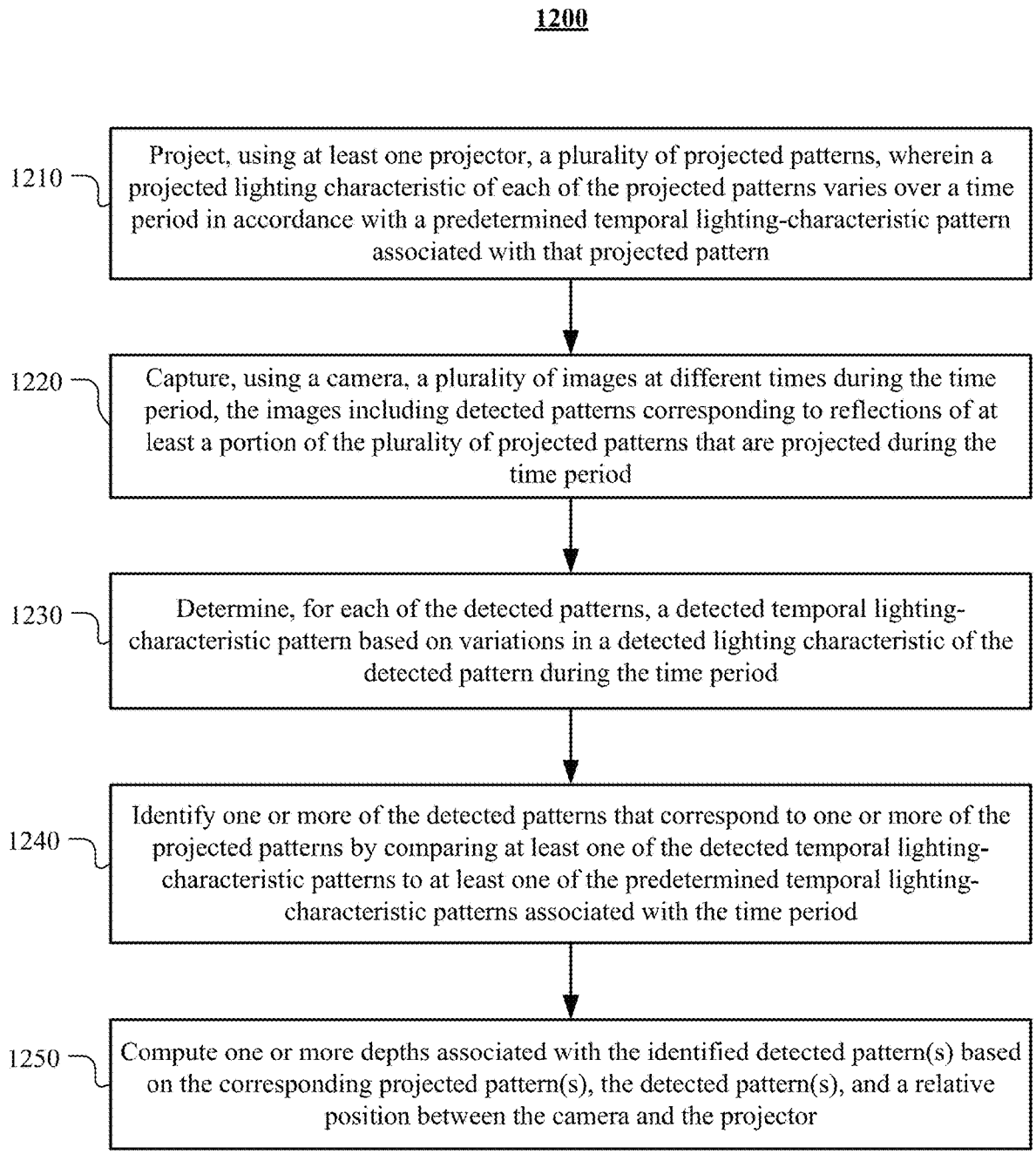
FIG. 12 illustrates an example method for determining depth using temporal patterns.

FIG. 12 illustrates an example method 1200 for determining depth using temporal patterns. The method may begin at step 1210, where the method 1200 may project, using at least one projector, a plurality of projected patterns, wherein a projected lighting characteristic of each of the projected patterns varies over a time period in accordance with a predetermined temporal lighting-characteristic pattern associated with that projected pattern. At step 1220, the method 1200 may capture, using a camera, a plurality of images at different times during the time period, the images including detected patterns corresponding to reflections of at least a portion of the plurality of projected patterns that are projected during the time period. At step 1230, the method 1200 may determine, for each of the detected patterns, a detected temporal lighting-characteristic pattern based on variations in a detected lighting characteristic of the detected pattern during the time period. At step 1240, the method 1200 may identify one or more of the detected patterns that correspond to one or more of the projected patterns by comparing at least one of the detected temporal lighting-characteristic patterns to at least one of the predetermined temporal lighting-characteristic patterns associated with the time period. At step 1250, the method 1200 may Compute one or more depths associated with the identified detected pattern(s) based on the corresponding projected pattern(s), the detected pattern(s), and a relative position between the camera and the projector.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for determining depth using temporal patterns including the particular steps of the method of FIG. 12, this disclosure contemplates any suitable method for determining depth using temporal patterns including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

In particular embodiments, a light emitting device, such as a projector, may have multiple individually-addressable emitters. Multiple emitters may be activated to produce a lighting pattern, which may appear as a set of individual light sources that can be detected by a camera and used to determine locations of objects, e.g., by matching reflected patterns to particular projected patterns and performing triangulations. The density of the arrangement of emitters on a light emitting device such as a projector may affect the accuracy with which locations are determined. For example, emitters that closer to each other may provide more detectable points in a unit of area. However, if the emitters are too close to each other, then because of the Gaussian distribution of light intensity in the beam projected by each emitter, in which light near the center of the beam is very bright, the light from adjacent emitters may merge (e.g., overlap), and the light beams from the individual emitters may become unresolvable when viewed by a camera that is closer than a threshold distance. Thus, when a camera is relatively close to a projector, adjacent emitters should be separated from each other by a separation distance sufficiently large to prevent merging of their light beams. However, when viewed from farther distances, the emitters that are separated by that separation distance appear farther apart, and depth resolution accuracy may therefore be reduced.

In particular embodiments, to address this problem, as a camera moves closer to a projector, when the Gaussian light beams from multiple emitters merge together, one or more of the active illuminators may be deactivated to provide additional space between active emitters. To avoid decreased accuracy when the camera is farther from the emitter, as a camera moves farther away from a projector, and the distance between detected light sources increases, additional emitters may be activated. The range of distances at which a camera can identify particular points of light from an emitter may thus be extended by modifying the emitted light pattern so the distance between each adjacent pair of illuminated emitters is greater when the camera is closer to the emitters than when the camera is farther away. Increasing the distance between emitters in this way prevents the light produced by different emitters from merging together when the camera is closer. The emitted light pattern may be modified so that the distance between adjacent pairs of emitters is smaller when the camera is farther from the emitter, since the distance between emitters would otherwise be greater than necessary, which could result in less accurate identification of point locations.

In particular embodiments, the density of a lighting pattern projected by a projection device that includes addressable emitters may be varied by activating or deactivating individual emitters. Higher-density patterns may be projected by activating emitters that are spaced more closely together, and lower-density patterns may be projected by activating emitters that are spaced farther apart. Higher-density patterns may use more emitters and may thus use more power than lower-density patterns. Further, higher-density patterns may be unresolvable from close distances. Lower-density patterns may be resolvable from close distances but may provide less accurate position determination than higher-density patterns. For applications that involve determining depth to objects at relatively close distances, such as hand movement, lower-density patterns may be used. For applications that involve determining depth at farther distances, such as constructing a depth map of a room or larger space, higher-density patterns may be used. An addressable emitter may be used for both types of applications by activating relatively sparse patterns of emitters for closer distances (e.g., by activating half of the emitters on a projector) and activating relatively dense patterns of emitters for farther distances (e.g., by activating all of the emitters on a projector).

In particular embodiments, the appropriate density of emitters to activate may be determined by projecting a pattern, using a camera to capture an image of the pattern, and determining whether to increase or decrease the density of the pattern based on the image. For example, if a dense pattern is projected using 9 emitters of a device, and the light from the individual emitters cannot be resolved (e.g., the light is merged together and does not appear as 9 separate light sources), then the camera may be too close to the emitters to resolve the dense pattern, and the density of the pattern may be decreased. The density may be decreased by, e.g., deactivating half of the active emitters, e.g., every second active emitter, and capturing an image of the remaining the active emitters. If the individual emitters still cannot be resolved, then the process may be repeated, e.g., by deactivating half of the active emitters again and determining whether the remaining emitters can be resolved, and so on, until the active emitters can be resolved (e.g., the number of distinct light sources detected in the camera image matches the number of active emitters). Light sources need not be completely separate to be individually-resolvable; an overlap threshold may be used to resolve light sources that are partially overlapping, for example. As another example, if individual light sources can be resolved, then additional emitters may be activated, e.g., by doubling the number of active emitters. A camera may then capture an image of the increased number of emitters. If the active emitters can be resolved, then they may be used for subsequent frames, or, alternatively, the number of active emitters may be increased again, until the active emitters cannot be resolved, at which point the previous (resolvable) pattern of active emitters may be used for subsequent frames.

In particular embodiments, dense and sparse patterns may be projected in alternating frames by activating emitters that are closer together for the dense pattern and activating emitters that are farther apart for the sparse patterns. A camera may detect the alternating sparse and dense patterns and determine whether the emitters can be resolved in each pattern. If emitters can be resolved in the dense pattern, then the dense pattern may be used subsequently (e.g., for projection to be detected in subsequent frames captured by a camera), unless the pattern is more dense than necessary, in which case a more sparse pattern may be used. A pattern may be more dense than necessary if, for example, the density of the pattern provides more accuracy than needed or than can be used because of other limitations on accuracy, e.g., limitations from other devices such as camera frame rate.

If the individual emitters of the dense pattern cannot be resolved, then the Gaussian light from the emitters may be overlapping, and a more sparse pattern may be projected subsequently (e.g., for use in frames captured subsequently by a camera). For example, if the individual emitters of the sparse pattern can be resolved, then the sparse pattern may be used subsequently, or new sparse pattern having a density between the sparse pattern and the non-resolvable dense pattern may be generated and projected. The new sparse pattern may be analyzed as described above to determine if it is resolvable and should be projected for use in subsequent frames. For example, the width of a line or intensity of light may be used to determine that Gaussian beams have merged together.

Figure 13A:
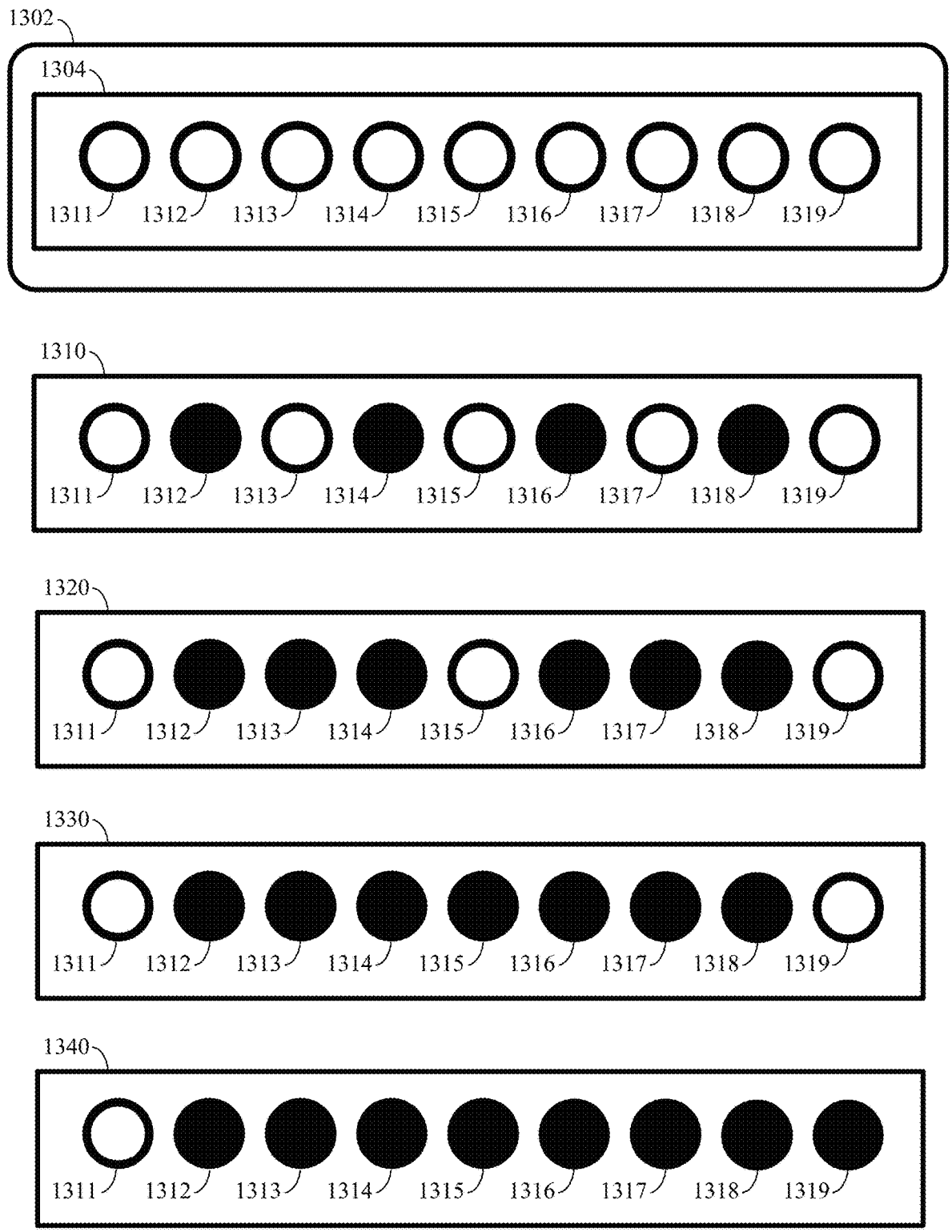
FIG. 13A illustrates example illumination patterns of an illuminator for determining depth from different distances.

FIG. 13A illustrates example illumination patterns of an illuminator 1302 for determining depth from different distances. The illuminator 1302 may be, e.g., an addressable illuminator and may be included in a projector. The illuminator in this example has 9 emitters 1311-1319. All 9 emitters are active, e.g., emitting light, in a first pattern 1304. The emitters may emit patterns for use in depth sensing, for example. However, as a camera moves closer to the projector 1302, the Gaussian light distributions from the active emitters may appear to merge together because of the intensity properties of the Gaussian light. Thus, at sufficiently close distances, the light from multiple emitters may merge together, and the individual features of the light pattern, e.g., the dots or lines produced by the emitters 1310-1318, may no longer be resolvable. The accuracy of structured depth-sensing techniques may be reduced at short distances because of this merging of the Gaussian light patterns. In particular embodiments, one or more of the active emitters may be deactivated, thereby increasing the distance between active emitters, so that the light from active emitters does not merge when a camera is closer than a certain distance. It may be desirable for emitters to remain active if possible, since a larger number of active emitters may provide more accurate depth sensing. Thus, the particular emitters to deactivate may be identified using an iterative process.

As shown in FIG. 13A, when the light from the emitters begins to merge together, e.g., because the camera is less than a threshold distance from the emitters, every second active emitter may be deactivated. In the initial pattern 1304, all 9 emitters are active, so deactivating every other active emitter results in the second, fourth, sixth, and eighth emitters being deactivated, as shown in the second pattern 1310. Emitters 1312, 1314, 1316, and 1318 have been deactivated, and emitters 1311, 1313, 1315, 1317, and 1319 remain active in the pattern 1310. The light from the emitters may still appear to merge of the camera is sufficiently close to the projector 1302, or may begin to merge as the camera moves closer to the projector 1302. If light is still merged or becomes merged again, e.g., individual emitters are not resolvable, then additional emitters may be deactivated by again deactivating every second active emitter. The third and seventh emitters are thus deactivated, producing the pattern 1320, in which emitters 1311, 1315, and 1319 remain active.

If light is still merged or becomes merged after a period of time, additional emitters may be deactivated by again deactivating every second active emitter. The fifth emitter is thus deactivated, producing the pattern 1330, in which emitters 1311 and 1319 are active. Then if light is still merged or becomes merged after a period of time, additional emitters may be deactivated by again deactivating every second active emitter. The ninth emitter is thus deactivated, producing the pattern 1340, in which only emitter 1311 is active. Since only one emitter is active in this example, merging of light from two emitters does not occur. It may be desirable to re-activate emitters if the distance between the camera and the projector 1302 increases.

As an example, the emitters may be re-activated in the reverse of the order in which they were de-activated, e.g., by activating pattern 1330, and if there is no merging of light, activating pattern 1320, and if there is still no merging of light, activating pattern 1310, and finally, if there is still no merging of light, activating all emitters of the projector 1302. Although the emitters are described as being deactivated or activated according to patterns 1310-1340, these patterns are merely examples, and the lights may be deactivated or activated according to other patterns, e.g., by deactivating odd-numbered emitters or even numbered emitters instead of every second emitter, or by deactivating more emitters at each step, e.g., by starting the deactivations with pattern 1320 instead of pattern 1310, and continuing directly to pattern 1340 after pattern 1320.

Figure 13B:
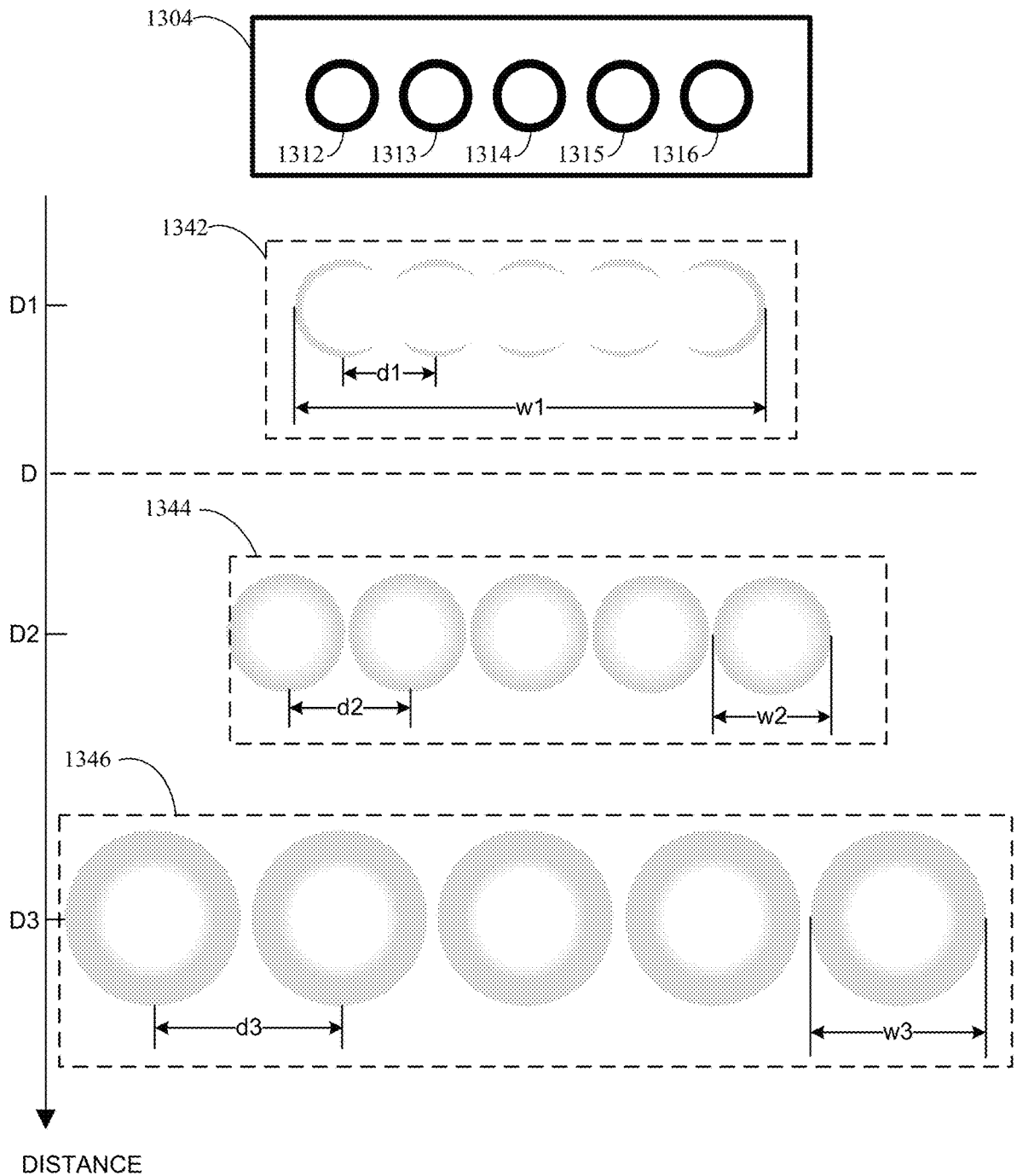
FIG. 13B illustrates example Gaussian illumination patterns viewed from different distances.

FIG. 13B illustrates example light patterns viewed from different distances. As introduced above, since the intensity of light increases as a viewer (e.g., a camera) moves closer to a light source, the Gaussian light beams from adjacent emitters 1312-1316 of an addressable illuminator 1302 appear to merge together as shown by a light pattern 1342, and light beams from the individual emitters 1312-1316 become indistinguishable in a camera image of the merged light pattern 1342. This merging of light may occur when the distance D1 between the illuminator 1302 and a camera is less than a threshold distance D. In the merged light pattern 1342, the light beams from adjacent emitters 1312, 1313 are separated by a distance d1. A width of a resolvable feature, which is the merged light pattern, is labeled w1.

As the distance between the illuminator 1302 and the camera increases, the light beams become larger and individually-resolvable, as shown in a light pattern 1344. In the light pattern 1344, which illustrates the appearance of the light from the illuminator 1302 from a distance D2>D, the light beams from adjacent emitters 1312, 1313 are separated by a distance d2. A width of a resolvable feature, which is a light beam, is labeled w2. As the distance between the illuminator 1302 and the camera increases further, the light beams become larger, as shown in a light pattern 1346. In the light pattern 1346, which illustrates the appearance of the light from the illuminator 1302 from a distance D3>D2, the light beams from adjacent emitters 1312, 1313 are separated by a distance d3. A width of a resolvable feature, which is a light beam, is labeled w3.

Figure 13C:
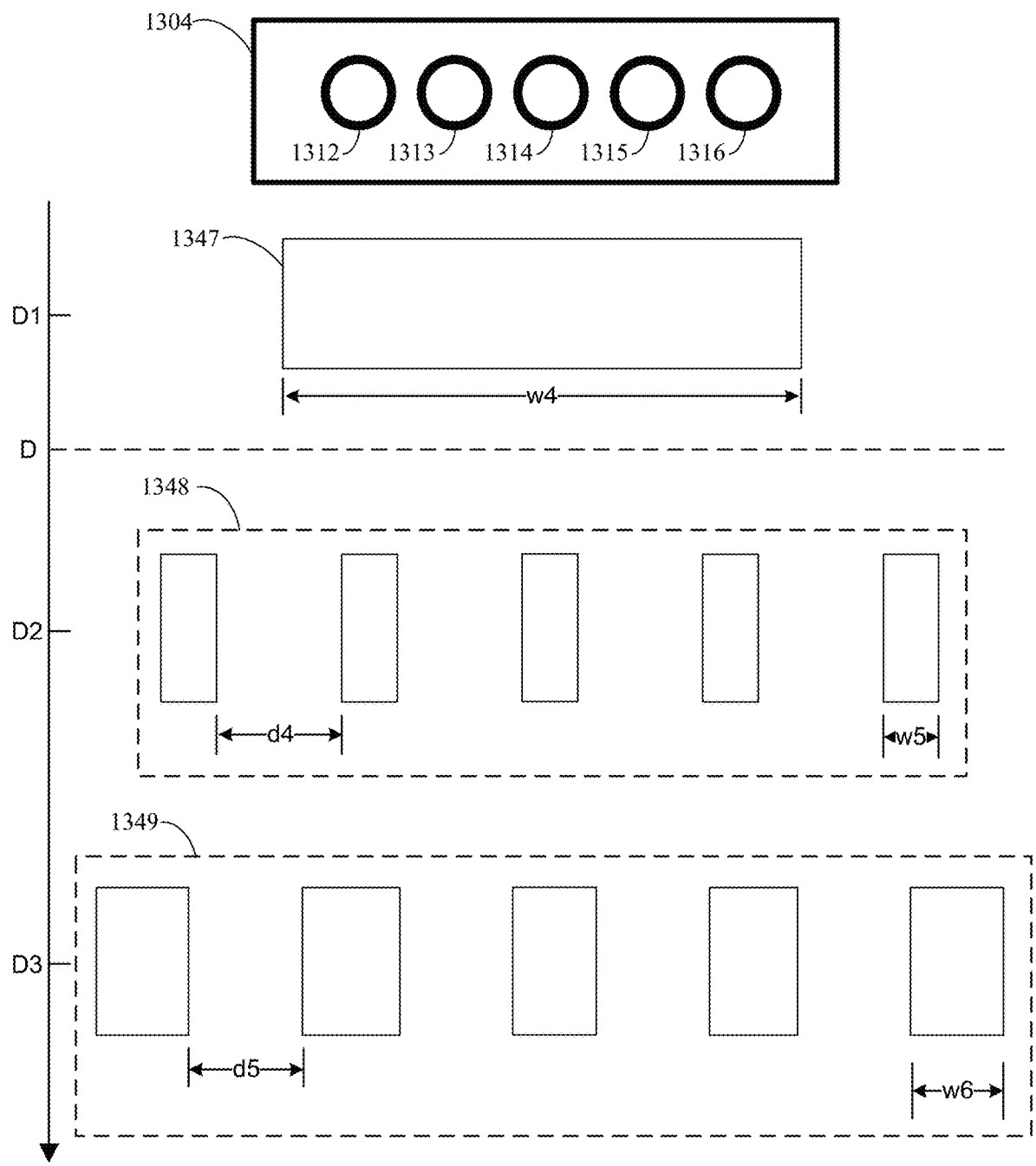
FIG. 13C illustrates example projected patterns viewed from different distances.

FIG. 13C illustrates example projected patterns viewed from different distances. In this figure, the emitters of the illuminator 1302 project lines of light. When viewed from a short distance, the Gaussian light beams from adjacent emitters 1312-1316 of the emitters may appear to merge together as shown by a merged light pattern 1347, and light beams from the individual emitters 1312-1316 become indistinguishable in a camera image of the merged light pattern 1347. The distance D1 between the illuminator 1302 and a camera is less than a threshold distance D. A width of a resolvable feature, which is the merged light pattern, is labeled w4.

As the distance between the illuminator 1302 and the camera increases, the light beams become larger and individually-resolvable, as shown in a light pattern 1348. In the light pattern 1348, which illustrates the appearance of the light from the illuminator 1302 from a distance D2>D, the light beams from adjacent emitters 1312, 1313 are separated by a distance d4. A width of a resolvable feature, which is a line produced by an emitter (and may include one or more light beams), is labeled w5. As the distance between the illuminator 1302 and the camera increases further, the light beams become larger, as shown in a light pattern 1349. In the light pattern 1349, which illustrates the appearance of the light from the illuminator 1302 from a distance D3>D2, the light beams from adjacent emitters 1312, 1313 are separated by a distance d5. A width of a resolvable feature, which is the line produced by an emitter, is labeled w6.

Figure 13D:
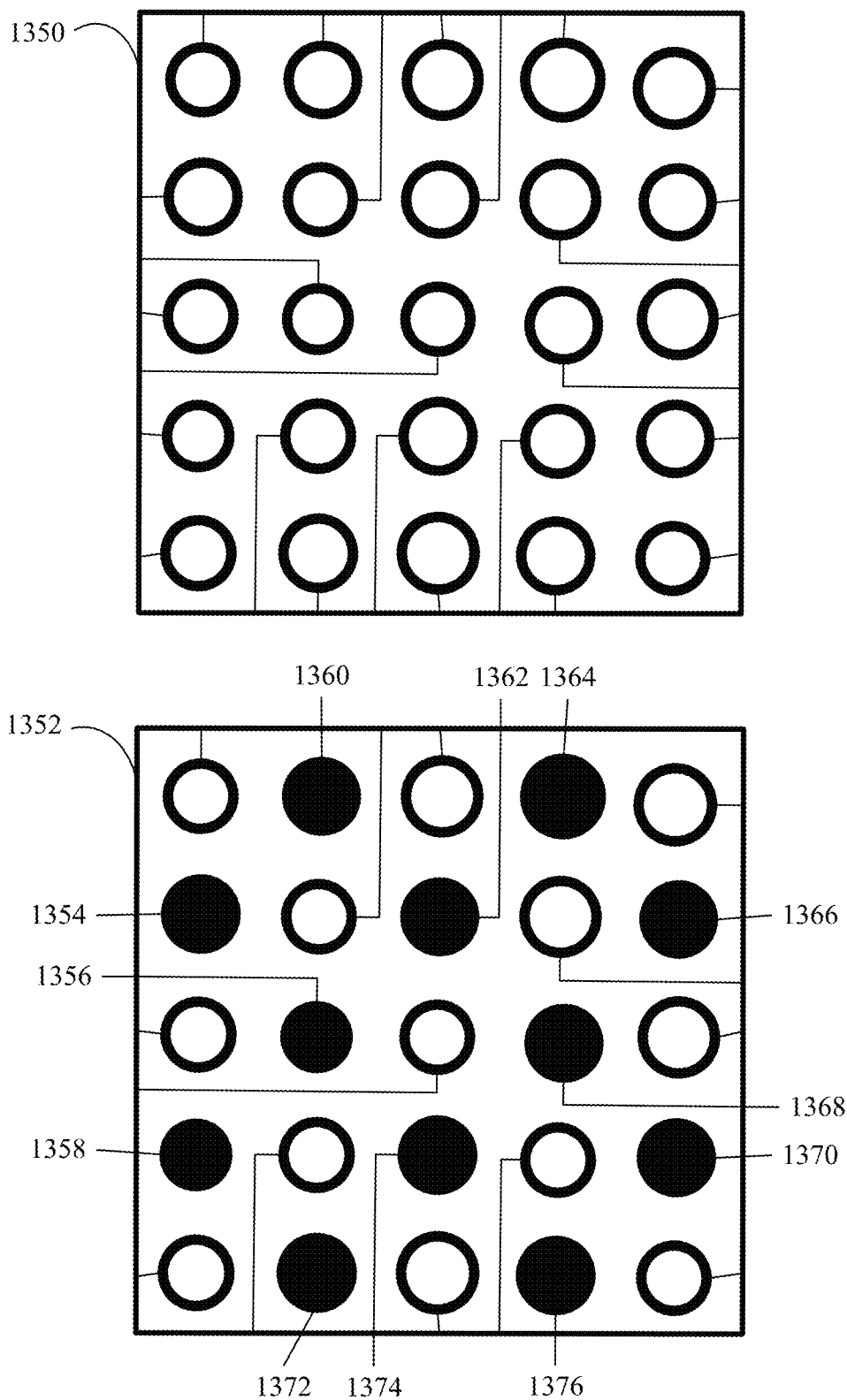
FIGS. 13D and E illustrate example illumination patterns of a two-dimensional illuminator for determining depth from different distances.
Figure 13E:
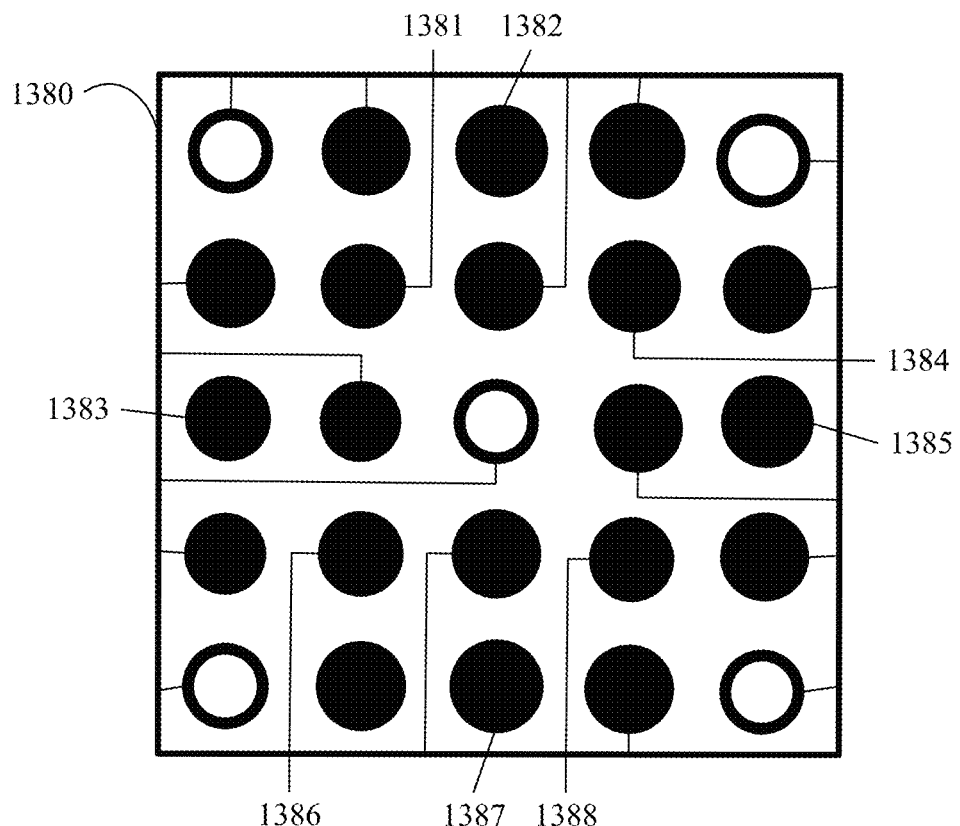
Figure 13E:
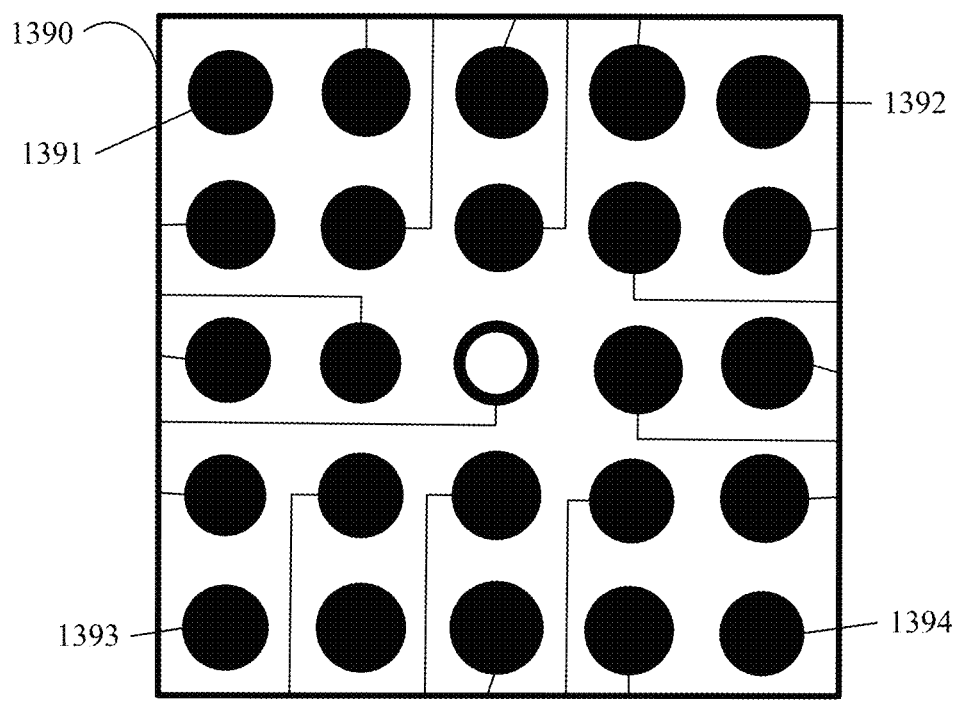

FIGS. 13D and 13E illustrate example illumination patterns of a two-dimensional illuminator for determining depth from different distances. In particular embodiments, when the light from the emitters begins to merge together, e.g., because the camera is less than a threshold distance from the emitters, a set of the emitters may be deactivated. The emitters to deactivate may be selected to that there are no horizontally or vertically adjacent pairs of active emitters. That is, so there are no active emitters separated by a horizontal or vertical distance of 1. Alternatively, half of the active emitters may be deactivated by selecting every second active emitter may be deactivated. As shown in FIG. 13D, in an initial pattern 1350, 25 emitters are active. Every second active emitter may be identified by starting at the top left of the emitter pattern 1350 and selecting every second emitter. When the end of a row is reached, the selection may continue on to the next row. Deactivating every second active emitter of the pattern 1350 results in the even-numbered emitters being deactivated, as shown in the second pattern 1352. In the second pattern 1352, emitters 1354, 1356, 1358, 1360, 1362, 1364, 1366, 1368, 1370, 1372, 1374, and 1376 have been deactivated. The light from the emitters may still appear to merge of the camera is sufficiently close to the projector, or may begin to merge as the camera moves closer to the projector. If light is still merged or becomes merged again, e.g., individual emitters are not resolvable, then additional emitters may be deactivated. The emitters to deactivate may be selected to that there are no active emitters separated by a horizontal or vertical distance of 2. The result of deactivating these emitters is shown in FIG. 13E as pattern 1380, in which emitters 1381, 1382, 1383, 1384, 1385, 1386, 1387, and 1388 have been deactivated. Subsequently, if light is still merged or becomes merged after a period of time, additional emitters may be deactivated. Emitters 1391, 1392, 1393, and 1394 may thus be deactivated, producing the pattern 1390, in which only the center emitter is active. Since only one emitter is active in this example, merging of light from two emitters does not occur. It may be desirable to re-activate activate emitters if the distance between the camera and the projector 1302 subsequently increases.

In particular embodiments, the distance between the emitter and the camera may be determined and used to control the distance between emitters. Alternatively, the camera image may be analyzed to determine that adjacent lights have merged (e.g., to form a line) based on the width of the detected light, and the distance between each pair of emitters may be increased when the lights appear to merge. As another example, a bright light detected by a camera may or may not be from a structured light pattern. The emitter density, e.g., the number of active emitters in a particular area, may be changed in the next frame and the image in the frame evaluated to determine if the light is from a pattern by, e.g., activating or deactivating certain emitters, then determining whether the camera detects that those emitters have been activated or deactivated. This process may be repeated by activating or deactivating different emitters in each iteration of a loop and determining that the emitted patterns have been detected or not detected after a threshold number of iterations.

Figure 14:
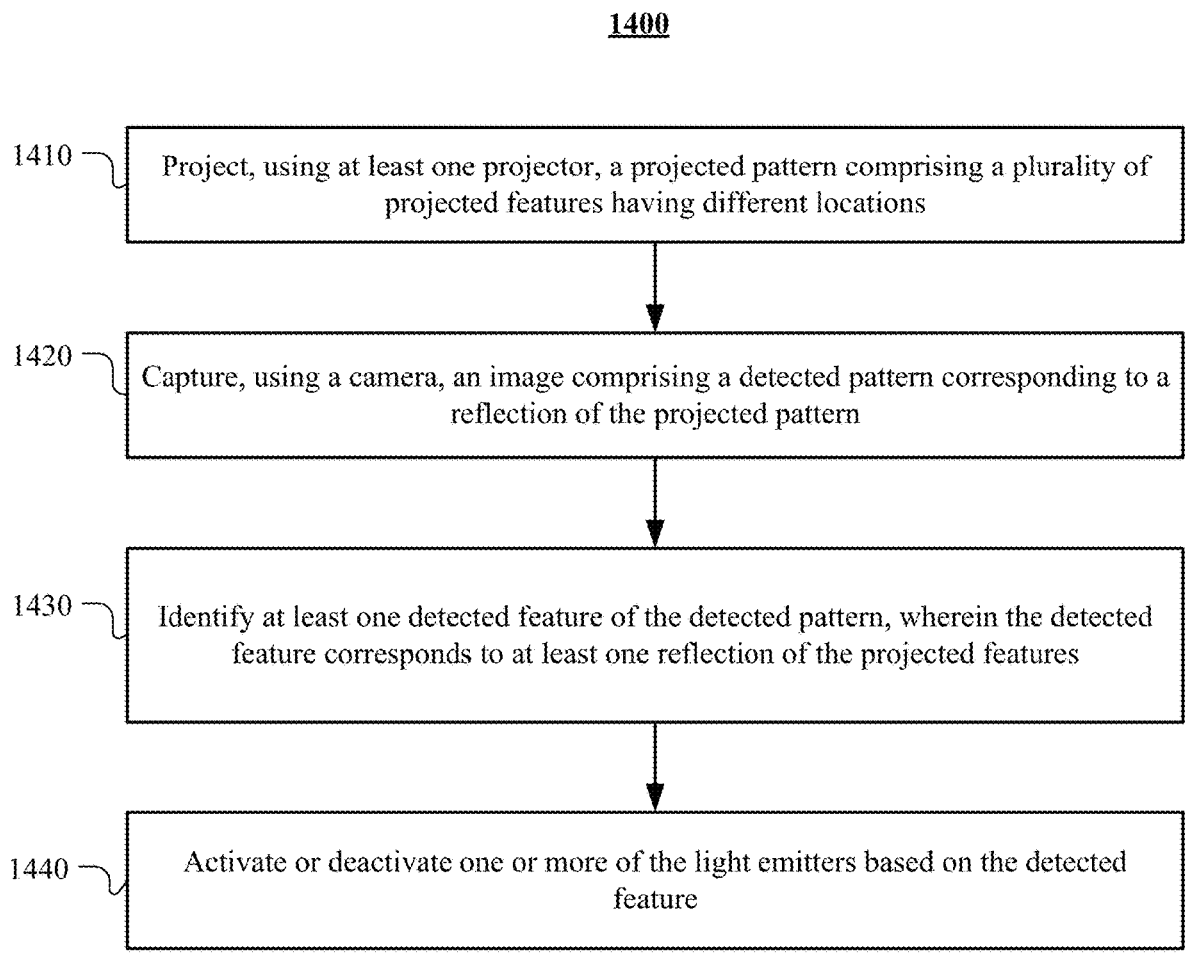
FIG. 14 illustrates an example method for activating or deactivating one or more light emitters of an illuminator for determining depth from different distances.

FIG. 14 illustrates an example method 1400 for activating or deactivating one or more light emitters of an illuminator for determining depth from different distances. The method may begin at step 1410, where the method 1400 may project, using at least one projector, a projected pattern comprising a plurality of projected features having different locations. At step 1420, the method 1400 may capture, using a camera, an image comprising a detected pattern corresponding to a reflection of the projected pattern. At step 1430, the method 1400 may Identify at least one detected feature of the detected pattern, wherein the detected feature corresponds to at least one reflection of the projected features. At step 1440, the method 1400 may activate or deactivate one or more of the light emitters based on the detected feature.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for activating or deactivating one or more light emitters of an illuminator for determining depth from different distances including the particular steps of the method of FIG. 14, this disclosure contemplates any suitable method for activating or deactivating one or more light emitters of an illuminator for determining depth from different distances including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

In a system that performs depth sensing using structured light, power consumption may be reduced by deactivating emitters of an illuminator that are not needed or not used, such as by scanning for movement in a scene by projecting a sparse pattern in a low-power mode and, upon identifying movement, projecting a denser pattern to update a depth map based on the motion. The disclosed techniques may use addressable illuminators, which may have individually-controllable emitters. The intensity of the structured light projected by the addressable emitters can vary based on input current. The structured light may be projected in a pattern such as a set of points, lines, or grid of lines.

In particular embodiments, a technique for saving power involves projecting a dense pattern to create a dense model of a scene, then subsequently operating in a low-power scanning mode by projecting a sparse pattern to sample portions of the scene for changes. If any changes are detected, such as motion that intersects one or more lines of the sparse pattern, then the dense pattern may again be projected to create or update the dense model of the scene. Further, portions of the scene may be sampled for changes by projecting a sparse pattern, such as a line, onto the portions and using a camera to detect reflections of the sparse pattern that indicate movement. Periodically, e.g., every second, a single-frame burst of a dense pattern may be projected to create or update the dense model of a scene.

Figure 15:
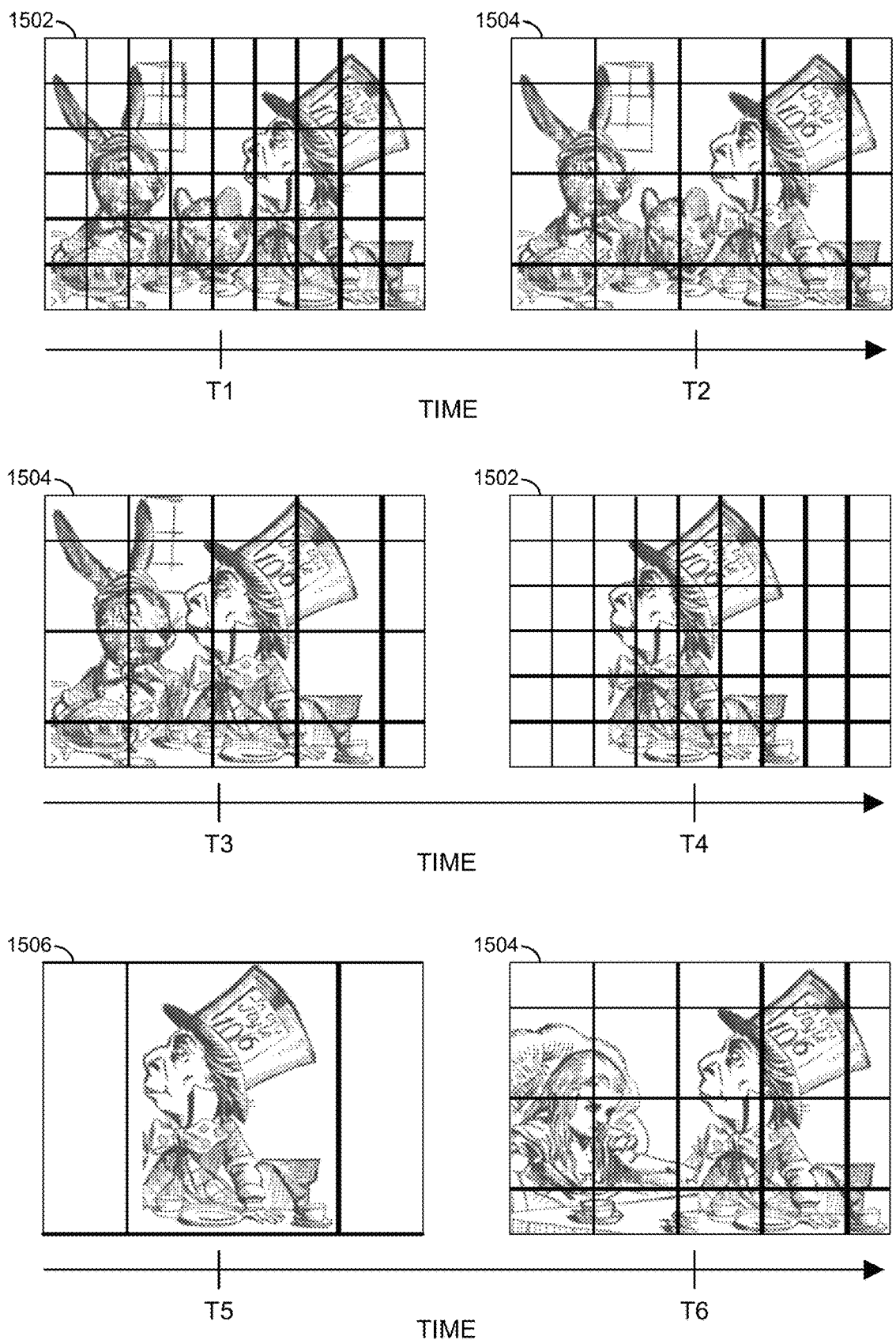
FIG. 15 illustrates an example of reducing grid light pattern density to reduce power consumption.

FIG. 15 illustrates an example of reducing grid light pattern density to reduce power consumption. A dense pattern 1502 is projected on a scene at time T1. At time T2, a sparser pattern is projected onto the scene because, for example, motion has not been detected in the scene between times T1 and T2. Since there is no motion, the existing depth map may be used at least through time T2. Since the depth map need not be updated between times T1 and at least T2, a sparser pattern 1504 may be projected at time T2 to detect motion. The use of the sparser pattern 1504 at time T2 may reduce power consumption, since fewer lines are projected in in sparse patterns than in dense patterns. At time T3, while the sparse pattern 1504 is still being projected, motion is detected in the scene, e.g., by detecting distortion of one or more of the grid lines of the pattern 1504 or by using a motion detection algorithm on an image of the scene. Since motion is detected, the scene has likely changed, and a new depth map should be generated using the dense pattern 1502. The dense pattern 1502 is thus again projected at time T4. At time T5, no further motion has been detected, so a sparse pattern 1506, which is sparser than the initial sparse pattern 1504, may be projected onto the scene. The density of the sparse pattern 1506, e.g., the distance between its lines, may be determined based on the size of a smallest detected object in the scene. For example, the smallest detected object in the scene at T5 is the Mad Hatter, so the distance between lines of the sparse pattern 1506 is selected so that motion of the Mad Hatter will be detected by the sparse pattern. The size of the object may be determined by generating a bounding box of the object. The distance between horizontal grid lines may then be set based on the height of the bounding box, and the distance between vertical grid lines may be set based on the width of the bounding box. At time T5, motion is detected when another person appears in the scene. A denser pattern 1504, which is denser than the previous pattern 1506, but not as dense as the dense pattern 1502, may then be projected onto the scene to detect further motion or to generate or update a depth map of the scene.

In particular embodiments, portions of the scene may be sampled for changes by projecting a sparse pattern, such as a line, onto the portions and using a camera to detect reflections of the sparse pattern that indicate movement. The portions of the scene to be sampled may be selected so that the entire scene is covered after a number of frames, or so that objects of at least a threshold minimum size are detected after a number of frames. The sizes of the scanned portions may correspond to distances between projected lines of the sparse pattern, and may be based on the expected size of an object. If a relatively large object is expected to move, then a relatively small number of lines spaced relatively far apart may be projected. For example, if the minimum size is one quarter of the scene area, and the sizes of the scanned portions correspond to the minimum size, then movement of an object of the minimum size may be detected within four consecutive frames.

In particular embodiments, the low-power scanning mode may project the pattern onto a different portion (e.g., region) of the scene in each subsequent frame until the entire scene (or an area of a particular size) has been scanned, at which point the process may repeat. In other examples, the sampled portions of the scene may be selected at random, or according to a specific application, such as searching for hands, which are known to be connected to arms. The sampling process may modify the search based on feedback generated during the search, e.g., the locations of reflected lines. In particular embodiments, an area of the portion of the scene may be smaller than an area of the scene. The portions may be identified by identifying a rectangle that encloses the first projected pattern and dividing the rectangle that encloses the first projected pattern into equal-sized rectangles, wherein each of the different portions corresponds to one of the rectangles. In particular embodiments, when the sampling process detects a change, the dense pattern may again be projected, e.g., in the next frame. In particular embodiments, movement of an object may be detected based on one or more of the second images, and the projector is configured to project the first projected pattern in response to detecting the movement of the object. In particular embodiments, one or more of the emitters may project each of the portions of the first projected pattern, and to project each portion, the projector is configured to activate the emitters that project the portion.

Figure 16:
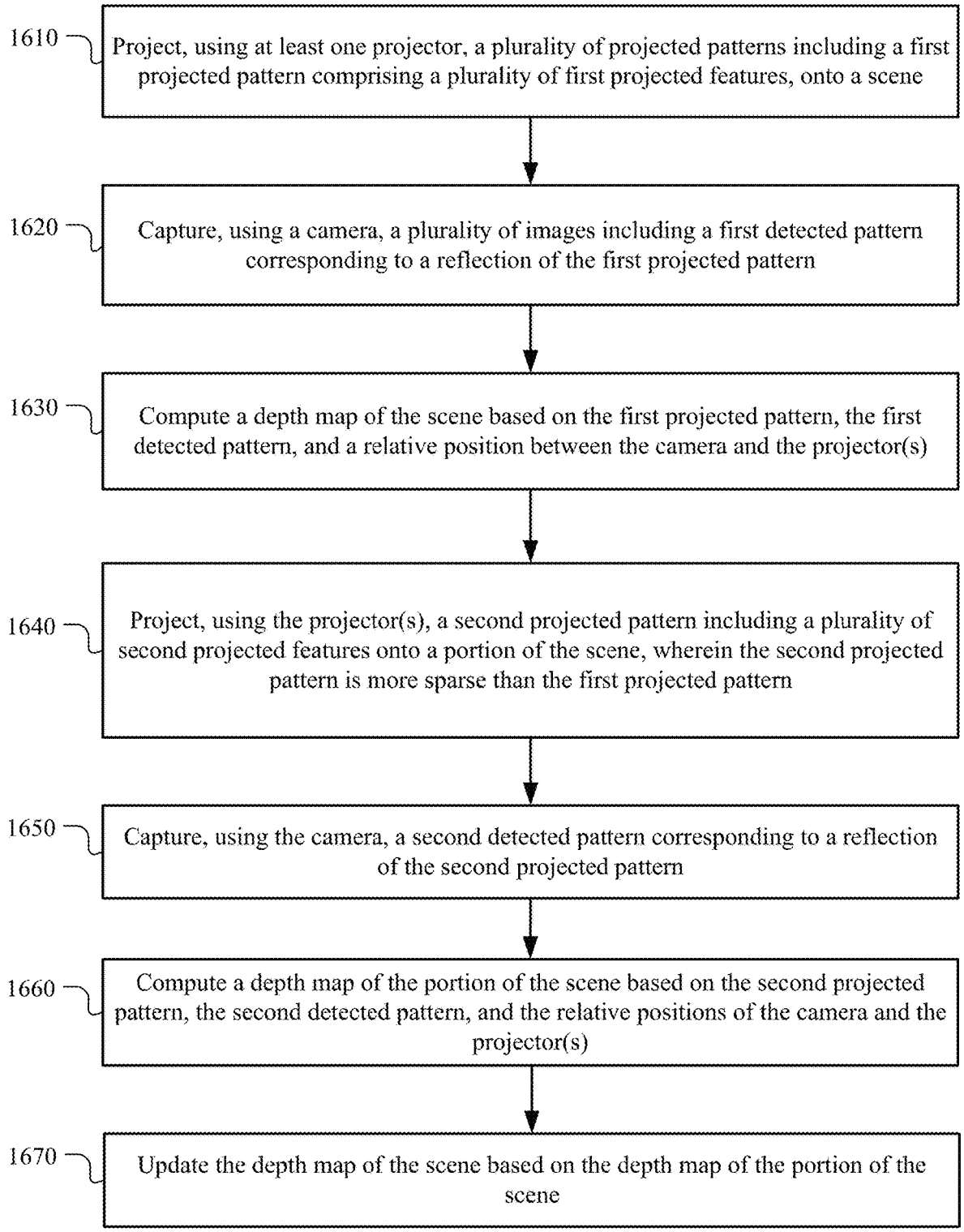
FIG. 16 illustrates an example method for reducing grid light pattern density.

FIG. 16 illustrates an example method 1600 for reducing grid light pattern density. The method may begin at step 1610, where the method 1600 may project, using at least one projector, a plurality of projected patterns including a first projected pattern comprising a plurality of first projected features, onto a scene. At step 1620, the method 1600 may capture, using a camera, a plurality of images including a first detected pattern corresponding to a reflection of the first projected pattern. At step 1630, the method 1600 may compute a depth map of the scene based on the first projected pattern, the first detected pattern, and a relative position between the camera and the projector(s). At step 1640, the method 1600 may Project, using the projector(s), a second projected pattern including a plurality of second projected features onto a portion of the scene, wherein the second projected pattern is more sparse than the first projected pattern. At step 1650, the method 1600 may capture, using the camera, a second detected pattern corresponding to a reflection of the second projected pattern. At step 1660, the method 1600 may compute a depth map of the portion of the scene based on the second projected pattern, the second detected pattern, and the relative positions of the camera and the projector(s). At step 1670, the method 1600 may update the depth map of the scene based on the depth map of the portion of the scene.

Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates an example method for reducing grid light pattern density including the particular steps of the method of FIG. 16, this disclosure contemplates any suitable method for reducing grid light pattern density including any suitable steps, which may include all, some, or none of the steps of the method of FIG. 16, where appropriate. Furthermore, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

To reduce power consumption, a pattern of points or lines projected in a frame at a particular time may be divided into two or more partial patterns, and the partial patterns may be projected in consecutive time intervals. A camera may capture the partial pattern at the time intervals in "partial" frames. Projecting a partial pattern in each frame in place of the entire pattern may reduce power consumption. For example, projecting half the lines of a pattern in one frame and the other half in the next frame may reduce power consumption by 50%. The camera may receive the consecutive partial frames and combine them to re-construct the complete pattern.

In particular embodiments, as a result of dividing a projected pattern into N partial patterns, each of frame may be divided into N "partial" frames, and each partial frame may have 1/N of the complete pattern. The value N may be understood as an "interlacing factor" and may be selected for a particular application according to a tradeoff between how fast the patterns are to be received and the desired amount of battery power savings. The interlacing factor may be changed between frames to adapt to the scene. For example, fast detection may be used for a scene of a person playing a piano, in which case all the lines of the pattern may be used in each frame, without dividing the pattern (N=1). When the person stops playing the piano, the interlacing factor may be increased to N=5. For a camera capturing images at 60 FPS and constructing a depth map as it moves around a room, each frame may be divided into five frames while maintaining the 60 FPS frame rate. In another example, one "line" (unit of pattern) may be projected in each frame. The camera frame rate may be changed to correspond to the projector frame rate.

Figure 17:
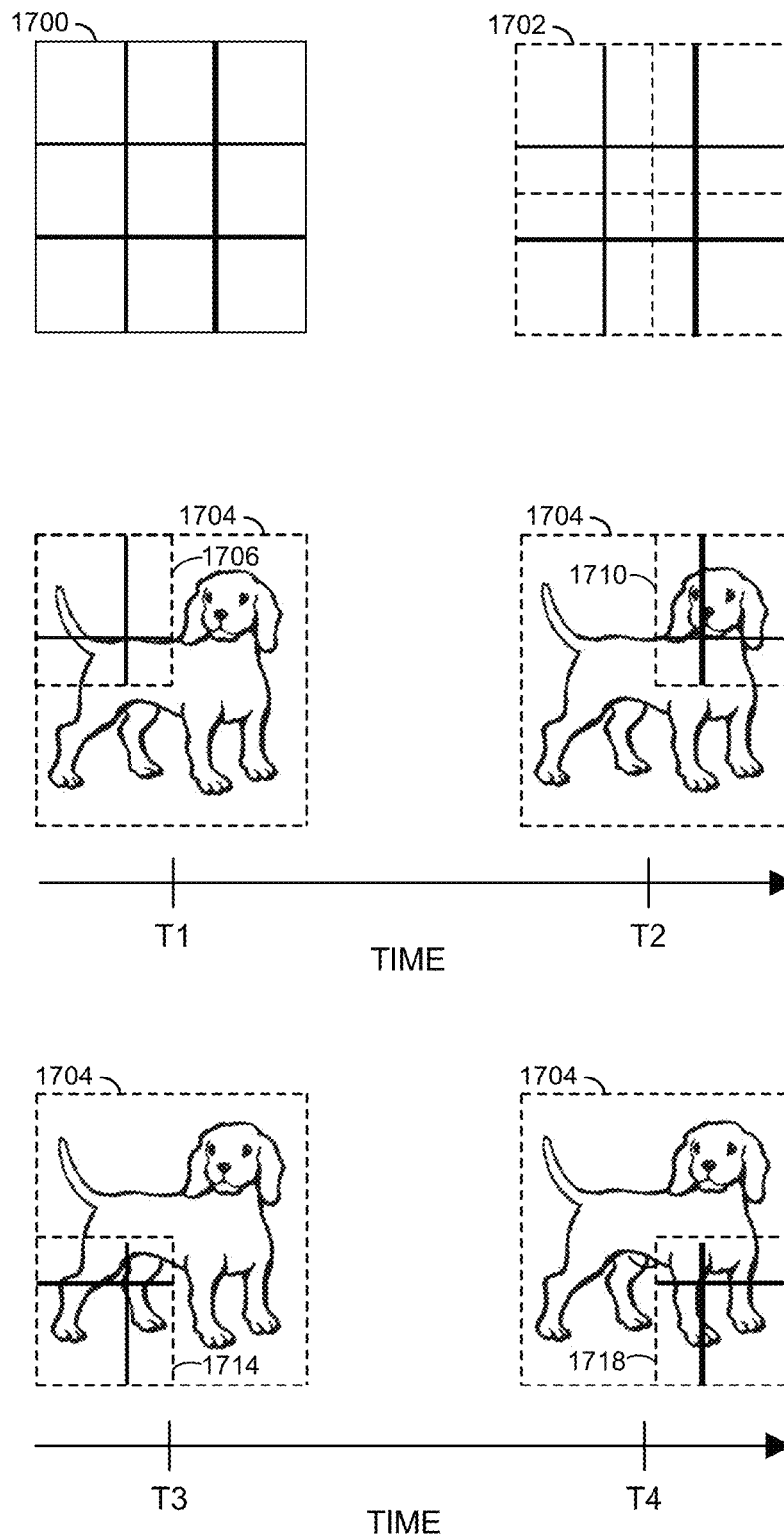
FIG. 17 illustrates an example of partitioning a grid light pattern into portions to reduce power consumption.

FIG. 17 illustrates an example of partitioning a grid light pattern into portions to reduce power consumption. A pattern 1700 may be divided into four partial patterns as shown by dotted lines 1702, which divide the pattern 1700 into four quarters. Each quarter of the pattern 1700 corresponds to a partial pattern. Each partial pattern may be projected onto a corresponding portion of the scene for a duration of time, during which a camera may capture reflections of the partial pattern from the scene and generate a depth map of the area of the scene 1704 covered by the projected partial pattern 1706. The partial patterns may be projected at different times. At time T1, a first partial pattern 1706 is projected onto the upper-left corner of the scene 1704. At time T2, a second partial pattern 1710 is projected onto the upper-right quarter of the scene 1704. The camera may capture reflections of the second partial pattern 1710 from the scene 1704 during the time that the second partial pattern 1710 is projected. The depth sensing system may identify detected patterns of the quarter of the screen based on reflections of the partial pattern. At time T3, the third partial pattern 1714 is projected onto the lower-left quarter of the scene 1704. The camera may capture reflections of the third partial pattern 1714 from the scene 1704 during the time that the third partial pattern 1714 is projected. At time T4, the fourth partial pattern 1718 is projected onto the lower-left quarter of the scene 1704. The camera may capture reflections of the third partial pattern 1718 from the scene 1704 during the time that the third partial pattern 1718 is projected.

In particular embodiments, the depth sensing system may identify partial detected patterns based the reflections of the four partial patterns while the partial patterns are being projected. Alternatively or additionally, the depth sensing system may identify detected patterns based on a combination of the reflections of the four partial patterns after the four partial patterns have been projected.

Figure 18:
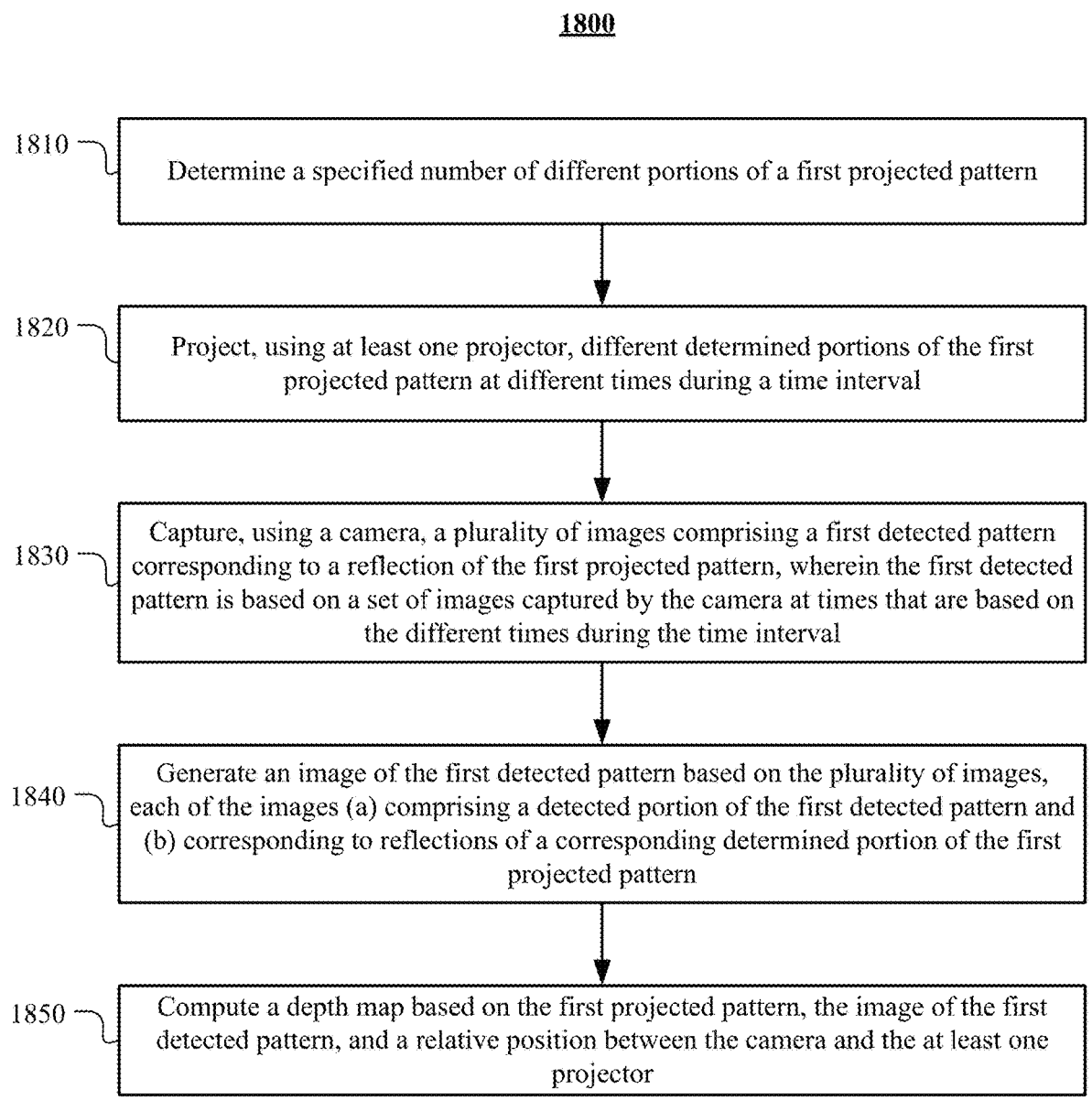
FIG. 18 illustrates an example method for partitioning a grid light pattern into portions to be projected at different times.

FIG. 18 illustrates an example method 1800 for partitioning a grid light pattern into portions to be projected at different times. The method may begin at step 1810, where the method 1800 may determine a specified number of different portions of a first projected pattern. At step 1820, the method 1800 may project, using at least one projector, different determined portions of the first projected pattern at different times during a time interval. At step 1830, the method 1800 may capture, using a camera, a plurality of images comprising a first detected pattern corresponding to a reflection of the first projected pattern, wherein the first detected pattern is based on a set of images captured by the camera at times that are based on the different times during the time interval. At step 1840, the method 1800 may generate an image of the first detected pattern based on the plurality of images, each of the images (a) comprising a detected portion of the first detected pattern and (b) corresponding to reflections of a corresponding determined portion of the first projected pattern. At step 1840, the method 1800 may Compute a depth map based on the first projected pattern, the image of the first detected pattern, and a relative position between the camera and the at least one projector.

Particular embodiments may repeat one or more steps of the method of FIG. 18, where appropriate. Although this disclosure describes and illustrates particular steps of the method of FIG. 18 as occurring in a particular order, this disclosure contemplates any suitable steps of the method of FIG. 18 occurring in any suitable order. Moreover, although this disclosure describes and illustrates an example method for partitioning a grid light pattern into portions to be projected at different times including the particular steps of the method of FIG. 18, this disclosure contemplates any suitable method for partitioning a grid light pattern into portions to be projected at different times including any suitable steps, which may include all, some, or none of the steps of the method of FIG. 18, where appropriate. Furthermore, although this disclosure describes and illustrates particular components, devices, or systems carrying out particular steps of the method of FIG. 18, this disclosure contemplates any suitable combination of any suitable components, devices, or systems carrying out any suitable steps of the method of FIG. 18.

Figure 19:
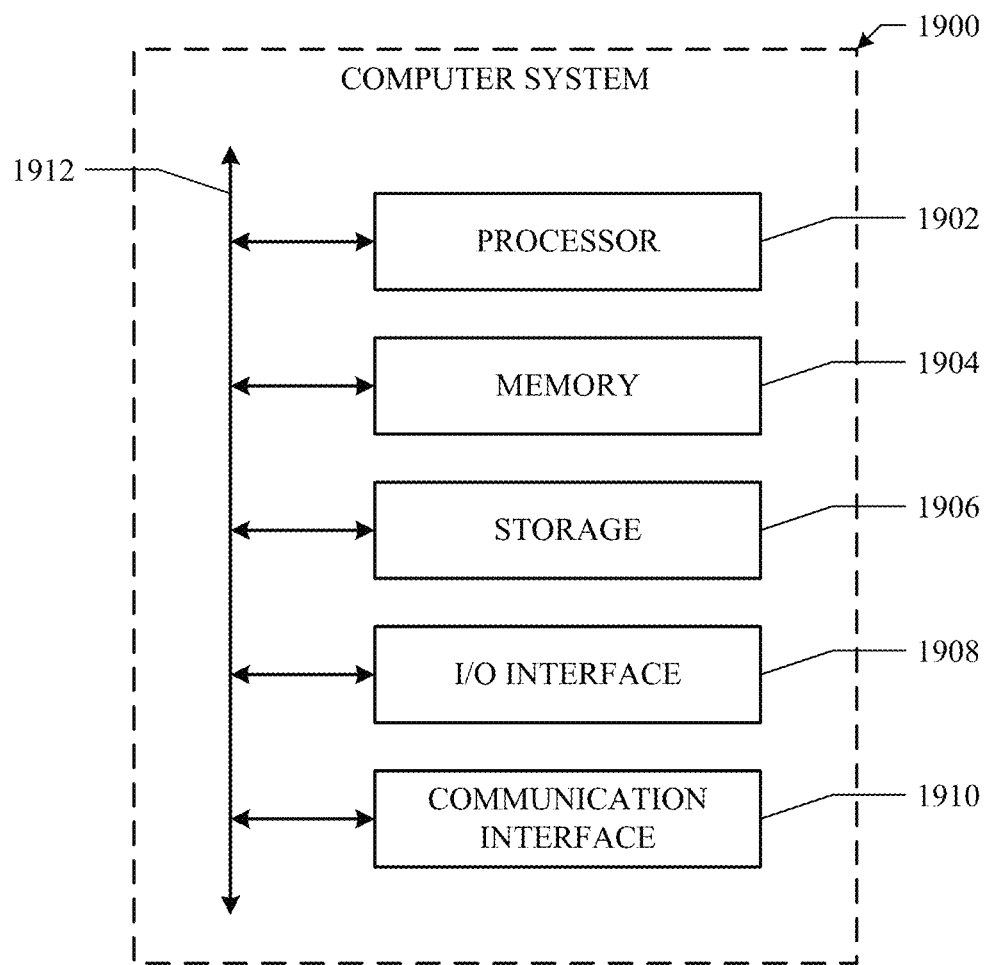
FIG. 19 illustrates an example computer system.

FIG. 19 illustrates an example computer system 1900. In particular embodiments, one or more computer systems 1900 perform one or more steps of one or more methods described or illustrated herein. In particular embodiments, one or more computer systems 1900 provide functionality described or illustrated herein. In particular embodiments, software running on one or more computer systems 1900 performs one or more steps of one or more methods described or illustrated herein or provides functionality described or illustrated herein. Particular embodiments include one or more portions of one or more computer systems 1900. Herein, reference to a computer system may encompass a computing device, and vice versa, where appropriate. Moreover, reference to a computer system may encompass one or more computer systems, where appropriate.

This disclosure contemplates any suitable number of computer systems 1900. This disclosure contemplates computer system 1900 taking any suitable physical form. As example and not by way of limitation, computer system 1900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1900 may include one or more computer systems 1900; be unitary or distributed; span multiple locations; span multiple machines; span multiple data centers; or reside in a cloud, which may include one or more cloud components in one or more networks. Where appropriate, one or more computer systems 1900 may perform without substantial spatial or temporal limitation one or more steps of one or more methods described or illustrated herein. As an example and not by way of limitation, one or more computer systems 1900 may perform in real time or in batch mode one or more steps of one or more methods described or illustrated herein. One or more computer systems 1900 may perform at different times or at different locations one or more steps of one or more methods described or illustrated herein, where appropriate.

In particular embodiments, computer system 1900 includes a processor 1902, memory 1904, storage 1906, an input/output (I/O) interface 1908, a communication interface 1910, and a bus 1912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1902 includes hardware for executing instructions, such as those making up a computer program. As an example and not by way of limitation, to execute instructions, processor 1902 may retrieve (or fetch) the instructions from an internal register, an internal cache, memory 1904, or storage 1906; decode and execute them; and then write one or more results to an internal register, an internal cache, memory 1904, or storage 1906. In particular embodiments, processor 1902 may include one or more internal caches for data, instructions, or addresses. This disclosure contemplates processor 1902 including any suitable number of any suitable internal caches, where appropriate. As an example and not by way of limitation, processor 1902 may include one or more instruction caches, one or more data caches, and one or more translation lookaside buffers (TLBs). Instructions in the instruction caches may be copies of instructions in memory

1904 or storage 1906, and the instruction caches may speed up retrieval of those instructions by processor 1902. Data in the data caches may be copies of data in memory 1904 or storage 1906 for instructions executing at processor 1902 to operate on; the results of previous instructions executed at processor 1902 for access by subsequent instructions executing at processor 1902 or for writing to memory 1904 or storage 1906; or other suitable data. The data caches may speed up read or write operations by processor 1902. The TLBs may speed up virtual-address translation for processor 1902. In particular embodiments, processor 1902 may include one or more internal registers for data, instructions, or addresses. This disclosure contemplates processor 1902 including any suitable number of any suitable internal registers, where appropriate. Where appropriate, processor 1902 may include one or more arithmetic logic units (ALUs); be a multi-core processor; or include one or more processors 1902. Although this disclosure describes and illustrates a particular processor, this disclosure contemplates any suitable processor.

In particular embodiments, memory 1904 includes main memory for storing instructions for processor 1902 to execute or data for processor 1902 to operate on. As an example and not by way of limitation, computer system 1900 may load instructions from storage 1906 or another source (such as, for example, another computer system 1900) to memory 1904. Processor 1902 may then load the instructions from memory 1904 to an internal register or internal cache. To execute the instructions, processor 1902 may retrieve the instructions from the internal register or internal cache and decode them. During or after execution of the instructions, processor 1902 may write one or more results (which may be intermediate or final results) to the internal register or internal cache. Processor 1902 may then write one or more of those results to memory 1904. In particular embodiments, processor 1902 executes only instructions in one or more internal registers or internal caches or in memory 1904 (as opposed to storage 1906 or elsewhere) and operates only on data in one or more internal registers or internal caches or in memory 1904 (as opposed to storage 1906 or elsewhere). One or more memory buses (which may each include an address bus and a data bus) may couple processor 1902 to memory 1904. Bus 1912 may include one or more memory buses, as described below. In particular embodiments, one or more memory management units (MMUs) reside between processor 1902 and memory 1904 and facilitate accesses to memory 1904 requested by processor 1902. In particular embodiments, memory 1904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1904 may include one or more memories 1904, where appropriate. Although this disclosure describes and illustrates particular memory, this disclosure contemplates any suitable memory.

In particular embodiments, storage 1906 includes mass storage for data or instructions. As an example and not by way of limitation, storage 1906 may include a hard disk drive (HDD), a floppy disk drive, flash memory, an optical disc, a magneto-optical disc, magnetic tape, or a Universal Serial Bus (USB) drive or a combination of two or more of these. Storage 1906 may include removable or non-removable (or fixed) media, where appropriate. Storage 1906 may be internal or external to computer system 1900, where appropriate. In particular embodiments, storage 1906 is non-volatile, solid-state memory. In particular embodiments, storage 1906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1906 taking any suitable physical form. Storage 1906 may include one or more storage control units facilitating communication between processor 1902 and storage 1906, where appropriate. Where appropriate, storage 1906 may include one or more storages 1906. Although this disclosure describes and illustrates particular storage, this disclosure contemplates any suitable storage.

In particular embodiments, I/O interface 1908 includes hardware, software, or both, providing one or more interfaces for communication between computer system 1900 and one or more I/O devices. Computer system 1900 may include one or more of these I/O devices, where appropriate. One or more of these I/O devices may enable communication between a person and computer system 1900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1908 for them. Where appropriate, I/O interface 1908 may include one or more device or software drivers enabling processor 1902 to drive one or more of these I/O devices. I/O interface 1908 may include one or more I/O interfaces 1908, where appropriate. Although this disclosure describes and illustrates a particular I/O interface, this disclosure contemplates any suitable I/O interface.

In particular embodiments, communication interface 1910 includes hardware, software, or both providing one or more interfaces for communication (such as, for example, packet-based communication) between computer system 1900 and one or more other computer systems 1900 or one or more networks. As an example and not by way of limitation, communication interface 1910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1910 for it. As an example and not by way of limitation, computer system 1900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1900 may include any suitable communication interface 1910 for any of these networks, where appropriate. Communication interface 1910 may include one or more communication interfaces 1910, where appropriate. Although this disclosure describes and illustrates a particular communication interface, this disclosure contemplates any suitable communication interface.

In particular embodiments, bus 1912 includes hardware, software, or both coupling components of computer system 1900 to each other. As an example and not by way of limitation, bus 1912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1912 may include one or more buses 1912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising, by a computing device:
   capturing, by a camera of the computing device, and during a time period, images comprising a plurality of detected patterns corresponding to reflections of a plurality of distinct projected patterns projected by a projector, wherein an intensity of each of the plurality of distinct projected patterns varies over the time period in accordance with a predetermined temporal lighting-characteristic pattern associated with the projected pattern, wherein a rate at which the images are captured by the camera is synchronized with a rate at which the intensity varies, and wherein the camera is configured to capture consecutive images over an interval of time corresponding to an interval of time between changes in the intensity of each of the plurality of distinct projected patterns;
   determining, based on the images, a detected temporal lighting-characteristic pattern for each of the detected patterns;
   detecting a correspondence between a first detected pattern of the detected patterns and a first projected pattern of the projected patterns by comparing the detected temporal lighting-characteristic pattern of the first detected pattern to the predetermined temporal lighting-characteristic pattern of the first projected pattern; and
   computing a depth associated with the first detected pattern based on the correspondence.

2. The method of claim 1,
   wherein computing a depth associated with the first detected pattern is based on a first detected pattern of the detected patterns, the first projected pattern of the projected patterns, and a relative position between the camera and the projector.

3. The method of claim 1, further comprising determining a degree of difference between the detected temporal lighting-characteristic pattern of the first detected pattern and the predetermined lighting-characteristic pattern of the first projected pattern.

4. The method of claim 1, wherein each projected pattern is projected at a different time.

5. The method of claim 1, wherein the predetermined temporal lighting-characteristic pattern comprises three or more different lighting intensities.

6. The method of claim 1, wherein each predetermined temporal lighting-characteristic pattern includes at least a threshold number of lighting characteristic values, and the threshold number is based on a desired level of accuracy.

7. The method of claim 1, wherein the rate at which the intensity of each of the plurality of distinct projected patterns varies is based on an expected speed of movement of one or more objects in a scene.

8. The method of claim 1, wherein the projected pattern has an associated density based on a distance between features in the projected pattern;
   the projected pattern is projected for one or more consecutive time periods, the projected intensity of the plurality of distinct projected patterns varies over each time period in accordance with the predetermined temporal lighting-characteristic pattern associated with the projected pattern, and
   the number of consecutive time periods is based on the density of the projected pattern.

9. The method of claim 1, further comprising:
capturing, during a time period, images comprising a plurality of detected pattern projected by the projector, wherein a second detected pattern is more sparse than the first detected pattern;
determining, based on the images, the detected temporal lighting-characteristic pattern for the second detected pattern;
detecting a correspondence between a second detected pattern of the detected patterns and a second projected pattern of the projected patterns by comparing the detected temporal lighting-characteristic pattern of the second detected pattern to the predetermined temporal lighting-characteristic pattern of the second projected pattern; and
computing a depth associated with the second detected pattern based on the correspondence.

10. The method of claim 9, wherein computing a depth associated with the second detected pattern is based on the second detected pattern of the detected patterns, the second projected pattern of the projected patterns, and a relative position between the camera and the projector.

11. The method of claim 1, wherein the at least one projector is configured to project at least one of the plurality of distinct projected patterns repeatedly over a plurality of time periods.

12. A system, comprising:
one or more processors; and
one or more computer-readable non-transitory storage media coupled to one or more processors and comprising instructions operable when executed by one or more processors to cause the system to:
capture, by a camera of the system, and during a time period, images comprising a plurality of detected patterns corresponding to reflections of a plurality of distinct projected patterns projected by a projector, wherein an intensity of each of the plurality of distinct projected patterns varies over the time period in accordance with a predetermined temporal lighting-characteristic pattern associated with the projected pattern, wherein a rate at which the images are captured by the camera is synchronized with a rate at which the intensity varies, and wherein the camera is configured to capture consecutive images over an interval of time corresponding to an interval of time between changes in the intensity of each of the plurality of distinct projected patterns;
determine, based on the images, a detected temporal lighting-characteristic pattern for each of the detected patterns;
detect a correspondence between a first detected pattern of the detected patterns and a first projected pattern of the projected patterns by comparing the detected temporal lighting-characteristic pattern of the first detected pattern to the predetermined temporal lighting-characteristic pattern of the first projected pattern; and
compute a depth associated with the first detected pattern based on the correspondence.

13. The system of claim 12,
wherein the depth associated with the first detected pattern is based on a first detected pattern of the detected patterns, the first projected pattern of the projected patterns, and a relative position between the camera and the projector.

14. The system of claim 12, wherein a degree of difference is determined between the detected temporal lighting-characteristic pattern of the first detected pattern and the predetermined lighting-characteristic pattern of the first projected pattern.

15. The system of claim 12, wherein the rate at which the intensity of each of the plurality of distinct projected patterns varies is based on an expected speed of movement of one or more objects in a scene.

16. The system of claim 12, wherein the first projected pattern has an associated density based on a distance between one or more features in the first projected pattern;
the first projected pattern is projected for one or more consecutive time periods, the projected intensity of the plurality distinct projected patterns varies over each time period in accordance with the predetermined temporal lighting-characteristic pattern of the first projected pattern; and
the number of consecutive time periods is based on the density of the first projected pattern.

17. One or more computer-readable non-transitory storage media embodying software that is operable when executed by one or more processors of a computing device to:
capture, by a camera of the computing device, and during a time period, images comprising a plurality of detected patterns corresponding to reflections of a plurality of distinct projected patterns projected by a projector, wherein an intensity of each of the plurality of distinct projected patterns varies over the time period in accordance with a predetermined temporal lighting-characteristic pattern associated with the projected pattern, wherein a rate at which the images are captured by the camera is synchronized with a rate at which the intensity varies, and wherein the camera is configured to capture consecutive images over an interval of time corresponding to an interval of time between changes in the intensity of each of the plurality of distinct projected patterns;
determine, based on the images, a detected temporal lighting-characteristic pattern for each of the detected patterns;
detect a correspondence between a first detected pattern of the detected patterns and a first projected pattern of the projected patterns by comparing the detected temporal lighting-characteristic pattern of the first detected pattern to the predetermined temporal lighting-characteristic pattern of the first projected pattern; and
compute a depth associated with the first detected pattern based on the correspondence.

18. The one or more computer-readable non-transitory storage media embodying software of claim 17,
wherein the depth associated with the first detected pattern is based on a first detected pattern of the detected patterns, the first projected pattern of the projected patterns, and a relative position between the camera and the projector.

19. The one or more computer-readable non-transitory storage media embodying software of claim 18, wherein a degree of difference is determined between the detected temporal lighting-characteristic pattern of the first detected pattern and the predetermined lighting-characteristic pattern of the first projected pattern.

20. The one or more computer-readable non-transitory storage media embodying software of claim 19, wherein the rate at which the intensity of each of the plurality of distinct projected patterns varies is based on an expected speed of movement of one or more objects in a scene.

* * * * *